US012699279B2

(12) United States Patent
Uchiumi et al.

(10) Patent No.: US 12,699,279 B2
(45) Date of Patent: Aug. 4, 2026

(54) SPECTACLES, SPECTACLE FRAME, AND POSITION ADJUSTMENT MECHANISM

(71) Applicant: ViXion Inc., Tokyo (JP)

(72) Inventors: Toshiharu Uchiumi, Tokyo (JP);
Shigeru Takizawa, Tokyo (JP)

(73) Assignee: ViXion Inc., Tokyo (JP)

( * ) Notice: Subject to any disclaimer, the term of this patent is extended or adjusted under 35 U.S.C. 154(b) by 204 days.

(21) Appl. No.: 18/553,534

(22) PCT Filed: Mar. 29, 2022

(86) PCT No.: PCT/JP2022/015662
§ 371 (c)(1),
(2) Date: Sep. 29, 2023

(87) PCT Pub. No.: WO2022/210772
PCT Pub. Date: Oct. 6, 2022

(65) Prior Publication Data
US 2024/0192519 A1      Jun. 13, 2024

(30) Foreign Application Priority Data

Apr. 2, 2021    (JP) ................................. 2021-063234
Sep. 10, 2021   (JP) ................................. 2021-148048

(51) Int. Cl.
*G02C 5/04*          (2006.01)
(52) U.S. Cl.
CPC .................................... *G02C 5/045* (2013.01)
(58) Field of Classification Search
CPC ................................ G02C 5/045; A61B 3/111
(Continued)

(56) References Cited

U.S. PATENT DOCUMENTS

| | | | |
|---|---|---|---|
| 5,076,665 A | 12/1991 | Petersen | |
| 12,092,896 B2* | 9/2024 | Maric | ................ G02B 27/0172 |

(Continued)

FOREIGN PATENT DOCUMENTS

| | | |
|---|---|---|
| CN | 100562776 C | 11/2009 |
| CN | 107490877 A | 12/2017 |

(Continued)

OTHER PUBLICATIONS

WIPO, Opinion of the international Preliminary Examining Authority for International Application No. PCT/JP2022/015662, Mar. 20, 2023.

(Continued)

*Primary Examiner* — Darryl J Collins
(74) *Attorney, Agent, or Firm* — Imaizumi IP Law, PLLC; Toshikatsu Imaizumi

(57) ABSTRACT

Disclosed are a spectacle frame and spectacles in which a distance between lenses can be adjusted. A spectacle frame of spectacles includes a bridge portion that holds a pair of left and right lens-holding portions to be movable in a left-right direction, a shaft portion that is rotatably supported in an axial direction by the bridge portion and includes a pair of left and right threaded portions formed with threads in opposite directions to each other, and a fixing portion that fixes the bridge portion 4 and the shaft portion, and then position adjustment portions of the lens-holding portions screw to the threaded portions, thereby a distance between the lens-holding portions is adjusted by rotating the shaft portion around an axis.

3 Claims, 13 Drawing Sheets

(58) Field of Classification Search
USPC ................................................ 351/128, 204
See application file for complete search history.

(56) References Cited

U.S. PATENT DOCUMENTS

| 2008/0030678 | A1 | 2/2008 | Koops et al. | |
| 2010/0134762 | A1* | 6/2010 | Liu ........................ | G02C 5/045 |
| | | | | 351/230 |
| 2011/0273665 | A1* | 11/2011 | Saffra ................. | G02C 13/003 |
| | | | | 351/204 |
| 2017/0188812 | A1* | 7/2017 | Feiertag ............... | A61B 3/0075 |
| 2021/0041723 | A1* | 2/2021 | Hikosaka ............. | G02C 13/001 |
| 2021/0240006 | A1* | 8/2021 | Rojas ....................... | G02C 5/20 |

FOREIGN PATENT DOCUMENTS

| CN | 113009714 | A | 6/2021 |
| CN | 213457543 | U | 6/2021 |
| CN | 213482573 | U | 6/2021 |
| CN | 213633997 | U | 7/2021 |
| CN | 214011652 | U | 8/2021 |
| GB | 2332062 | A | 6/1999 |
| JP | S59-55727 | U | 4/1984 |
| JP | S61-120 | U | 1/1986 |
| JP | H01-68350 | U | 5/1989 |
| JP | H05-313072 | A | 11/1993 |
| JP | H06-033672 | A | 2/1994 |
| JP | H06-501186 | A | 2/1994 |
| JP | H06-160782 | A | 6/1994 |
| JP | H07-281124 | A | 10/1995 |
| JP | 2000-262474 | A | 9/2000 |
| JP | 2001-519539 | A | 10/2001 |
| JP | 2001-340296 | A | 12/2001 |
| JP | 2004-000657 | A | 1/2004 |
| JP | 2007-240709 | A | 9/2007 |
| JP | 2008-303039 | A | 12/2008 |
| JP | 2009-154980 | A | 7/2009 |
| JP | 2011-002642 | A | 1/2011 |
| JP | 4783546 | B2 | 9/2011 |
| JP | 2017-070419 | A | 4/2017 |
| JP | 2021-021417 | A | 2/2021 |
| KR | H10-2015-0137418 | A | 12/2015 |
| WO | 2014-057711 | A1 | 6/2013 |
| WO | 2014-057711 | A | 4/2014 |

OTHER PUBLICATIONS

WIPO, International Search Report for International Application No. PCT/JP2022/015662, May 31, 2022.

WIPO, Written Opinion for International Application No., PCT/JP2022/015662, May 31, 2022.

WIPO, International Preliminary Report on Patentability (Chapter II of the Patent Cooperation Treaty) for International Application No. PCT/JP2022/015662 (Cite No. 3 of Non-Patent Literature Documents in this list), Jun. 20, 2023.

EPO, European Search Report for European Patent Application No. EP 22 78 0983, Mar. 18, 2025.

Japan Patent Office, Office Action for Japanese Patent Application No. 2023-511415, May 15, 2026.

* cited by examiner

SPECTACLES, SPECTACLE FRAME, AND POSITION ADJUSTMENT MECHANISM

TECHNICAL FIELD

The present invention relates to spectacles, spectacle frame, and position adjustment mechanism, and specifically relates to spectacles, spectacle frame, and position adjustment mechanism that can adjust a distance between lenses.

BACKGROUND ART

As a variable focus lens whose focal length can be changed by applying a voltage, for example, a variable focus lens disclosed in Patent Literature 1 is known.

Patent Literature 2 discloses spectacles that include a pair of left and right variable focus lenses having a variable focus function and a drive unit that drives the variable focus lenses. These spectacles have a configuration in which the entire circumference of the variable focus lens for each left and right eye is held by a rim. These rims are connected by a bridge, and temple portions are connected by providing endpiece portions on the horizontal outside of each rim.

CITATION LIST

Patent Literature

Patent Literature 1: Japanese Unexamined Patent Application Publication (Translation of PCT Application) No. 2001-519539.
Patent Literature 2: Japanese Unexamined Patent Application Publication No. 2007-240709.

SUMMARY OF INVENTION

Technical Problem

The variable focus lens of Patent Literature 1 can change the focal length by changing the applied voltage, so spectacles using this lens can be used both as far-vision spectacles when viewing far objects and as near-vision spectacles when viewing near objects by single pair of spectacles.

When wearing spectacles, it is normal to adjust a distance between the left and right lenses according to a distance between a wearer's left and right pupils, that is, a pupillary distance. It is desirable that the lenses of spectacles are on a straight line connecting the pupil of the wearer and the view object, but when using variable focus lenses as in Patent Literature 1 for spectacles, a distance between the lenses in a far-vision state and a distance between the lenses in a near-vision state are normally not equal, therefore it is required to be able to easily adjust the distance between lenses when using variable focus lenses for spectacles.

The present invention provides spectacles and spectacle frame that can adjust the distance between lenses.

Furthermore, for paired members (a pair of moved members) such as a pair of left and right ophthalmic lens portions in spectacles, it is desirable to easily adjust a position of each member. For example, in spectacles with small ophthalmic lens portions whose effective lens diameter is less than or equal to the corneal diameter of the wearer's eye, a slight shift in each position of the left and right ophthalmic lens portions in relation to the wearer's respective eyes can easily reduce visibility through the ophthalmic lens portions. In such cases, a user often makes fine adjustments to each position of the left and right ophthalmic lens portions, and the ability to easily adjust this position leads to improved convenience for the user.

Solution to Problem

An aspect of the present invention is spectacles including a pair of left and right lenses and a spectacle frame, it is characterized in that at least one of the left and right lenses is a variable focus lens, the spectacle frame includes a bridge portion that holds a pair of left and right lens-holding portions that hold the pair of left and right lenses to be movable in a left-right direction; a shaft portion that is rotatably supported in an axial direction by the bridge portion and includes a pair of left and right threaded portions; and a fixing portion that fixes the bridge portion and the shaft portion, the pair of left and right threaded portions are formed with ridges in opposite directions to each other, each of the pair of left and right lens-holding portions includes a position adjustment portion that screws into one of the pair of left and right threaded portions, and a distance between the pair of left and right lens-holding portions can be adjusted by rotating the shaft portion around an axis.

In the foregoing spectacles, the spectacle frame may further include a nose-pad portion supported movably in the left-right direction by the bridge portion, and the fixing portion may fix the bridge portion, the shaft portion, and the nose-pad portion.

Another aspect of the present invention is a spectacle frame, which includes a bridge portion that holds a pair of left and right lens-holding portions to be movable in a left-right direction; a shaft portion that is rotatably supported in an axial direction by the bridge portion and includes a pair of left and right threaded portions; and a fixing portion that fixes the bridge portion and the shaft portion, it is characterized in that the pair of left and right threaded portions are formed with ridges in opposite directions to each other, each of the pair of left and right lens-holding portions includes a position adjustment portion that screws into one of the pair of left and right threaded portions, and a distance between the pair of left and right lens-holding portions can be adjusted by rotating the shaft portion around an axis.

In the foregoing spectacle frame, which may include a nose-pad portion supported movably in the left-right direction by the bridge portion, and the fixing portion may fix the bridge portion, the shaft portion, and the nose-pad portion.

Still another aspect of the present invention is a position adjustment mechanism that adjusts positions of a pair of moved members, which includes an adjusting operation portion that receives an adjusting operation to adjust the positions of the pair of moved members; a plurality of moving portions that move each position of the pair of moved members in respective predetermined directions by an operating force of the adjusting operation received by the adjusting operation portion; and a switching operation portion that receives a switching operation, in which an all-transmission state in which the operating force is transmitted to all of the plurality of moving portions and a partial-transmission state in which the operating force is transmitted only to a part of the plurality of moving portions are switched in response to the switching operation received by the switching operation portion.

When adjusting each position (relative position with respect to a predetermined reference) of a pair of members (a pair of moved members), there is a case in which an adjustment by moving only a part of the pair of moved members is demanded or an adjustment by moving all of the pair of moved members at once is demanded. For example, when adjusting each position of lenses of spectacles included a pair of left and right lenses (the pair of moved members) to match each position (the reference) of eyes of the wearer, an adjustment by moving the position of both lenses at once is demanded or an adjustment by moving the position of only one lens is demanded.

Configurations that meet these demands include, for example, a configuration in which an adjusting operation portion that receives an adjusting operation to adjust positions of all the moved members at once and an operation portion that receives an adjusting operation to adjust positions of only part of the moved members are provided separately. However, with this configuration, a user must operate different adjusting operation portions when adjusting by moving the positions of all the moved members at once and when adjusting by moving the positions of only part of the moved members, which is inconvenient for the user.

The present position adjustment mechanism includes the plurality of moving portions that move each position of the pair of moved members in respective predetermined directions by the operating force of the adjusting operation received by the adjusting operation portion. Further, the all-transmission state in which the operating force is transmitted to all of the plurality of moving portions and the partial-transmission state in which the operating force is transmitted only to a part of the plurality of moving portions are switched in response to the switching operation received by the switching operation portion. As a result, if the user performs the switching operation on the switching operation portion to switch to the all-transmission state, the user can move and adjust the positions of all the moved members at once by the adjusting operation on the adjusting operation portion, and if the user performs the switching operation on the switching operation portion to switch to the partial-transmission state, the user can move and adjust the positions of only part of the moved members by the adjusting operation on the same adjustment operation portion.

Therefore, according to the present position adjustment mechanism, the user only needs to perform the adjusting operation on the same adjusting operation portion when adjusting by moving the positions of all the moved members at once and when adjusting by moving the positions of only part of the moved members, and it is possible to provide a high level of convenience to the user.

In the foregoing position adjustment mechanism, the plurality of moving portions may move the respective positions of the pair of moved members in a direction of approaching and separating from each other during the all-transmission state.

When adjusting the positions of all the moved members at once, it is often more convenient to move all the moved members closer to each other or away from each other than to move the positions of all the moved members while maintaining a distance between all the moved members. Therefore, according to the present position adjustment mechanism, it is possible to increase a convenience when moving and adjusting the positions of all the moved members at once.

Also, the foregoing position adjustment mechanism may be configured so that the operating force of the adjusting operation received by the adjusting operation portion is transmitted only to the part of the plurality of moving portions, and the operating force transmitted to the part of the plurality of moving portions can be transmitted to other moving portion of the plurality of moving portions, and when the switching operation portion receives the switching operation to make a restriction of moving by the other moving portion, the partial-transmission state may be switched to, and when the switching operation portion receives the switching operation to release the restriction of moving by the other moving portion, the all-transmission state may be switched to.

The present position adjustment mechanism is configured such that the operating force of the adjusting operation received by the adjusting operation portion is transmitted only to the part of the moving portion (the moving portion corresponding to the part of the moved member that is moved in the partial-transmission state). Further, when the operating force of the adjusting operation portion is transmitted to all of the plurality of moving portions, the operating force transmitted to the part of the moving portions is transmitted to the other moving portion.

In the present position adjustment mechanism, the operating force of the adjusting operation received by the adjusting operation portion is always transmitted to the part of the moving portions, but a transmitted state and a non-transmitted state for the other moving portion are switched in response to the switching operation received by the switching operation portion. Specifically, when the switching operation portion receives the switching operation to make a restriction of moving by the other moving portion, movement by the other moving portion is restricted, as a result, the operating force transmitted to the part of the moving portions is not transmitted to the other moving portion, thereby realizing the partial-transmission state. On the other hand, when the switching operation portion receives the switching operation to release the restriction of moving by the other moving portion, the movement by the other moving portion is not restricted, thus the operating force transmitted to the part of the moving portions is transmitted to the other moving portion, thereby realizing the all-transmission state.

According to the present position adjustment mechanism, it is possible to easily realize a configuration that switches between the all-transmission state and the partial-transmission state in response to the switching operation received by the switching operation portion.

Further, in the foregoing position adjustment mechanism, the adjusting operation portion may include a first operation portion connected only to the part of the plurality of moving portions, and a second operation portion connected only to the other moving portion, and when the second operation portion, as the switching operation portion, receives the switching operation to make the restriction of moving by the other moving portion, a first partial-transmission state in which the operating force of the first operation portion is transmitted only to the part of the plurality of moving portions may be switched to; when the first operation portion, as the switching operation portion, receives the switching operation to make the restriction of moving by the part of the plurality of moving portions, a second partial-transmission state in which the operating force of the second operation portion is transmitted only to the other moving portion may be switched to; and when either one of the first operation portion and the second operation portion, as the switching operation portion, receives the switching operation to release the restriction of moving by the moving portion corresponding to the above one operation portion, the all-transmission state in which the operating force of the other operation portion is transmitted to all of the plurality of moving portions may be switched to.

The present position adjustment mechanism can switch not only to the above-mentioned the all-transmission state and the partial-transmission state (the first partial-transmission state), but also to the second partial-transmission state in which the operating force of the second operation portion is transmitted only to the other moving portion. Therefore, according to the present position adjustment mechanism, it is possible to not only move and adjust the position of only a part of the pair of moved members, but also move and adjust the position of only other of the pair of moved members.

Moreover, the second operation portion functions as the switching operation portion that receives the switching operation in the first partial-transmission state, while the first operation portion functions as the switching operation portion that receives the switching operation in the second partial-transmission state. Also, either one of the first operation portion and the second operation portion functions as the switching operation portion that receives the switching operation in the all-transmission state. Therefore, there is no need to provide the switching operation portion separately from the first operation portion and the second operation portion, and the configuration is simplified.

Furthermore, in the foregoing position adjustment mechanism, the part of the plurality of moving portions and the other moving portion may be connected by magnetic force.

In the present position adjustment mechanism, as long as a load exceeding the magnetic force exerting a force to connect the part of the moving portions and the other moving portion is not applied to the other moving portion, the part of the moving portions and the other moving portion are integrally connected by magnetic force and interlocked. Therefore, when the switching operation portion receives the switching operation to release the restriction of moving by the other moving portion, a load exceeding the magnetic force is not applied to the other moving portion, and the part of the moving portions and the other moving portion can be interlocked. Thereby, the operating force can be transmitted from the part of the moving portions to the other moving portion, and the all-transmission state can be switched to. On the other hand, when the switching operation portion receives the switching operation to make the restriction of moving by the other moving portion, a load exceeding the magnetic force is applied to the other moving portion. In this case, since the other moving portion cannot be interlocked with the part of the moving portions, the operating force is not transmitted from the part of the moving portions to the other moving portion, and the partial-transmission state can be switched to.

Further, in the foregoing position adjustment mechanism, the part of the plurality of moving portions and the other moving portion may be connected by a connecting portion, and in the connecting portion, a connecting state in which the part of the plurality of moving portions and the other moving portion are connected and a disconnecting state in which the connecting is released may be switched in response to the switching operation received by the switching operation portion.

In the present position adjustment mechanism, it is possible to switch to the all-transmission state by switching the connecting portion to the connecting state, and it is possible to switch to the partial-transmission state by switching the connecting portion to the disconnecting state. Thereby, it is possible to easily realize a configuration that switches between the all-transmission state and the partial-transmission state in response to the switching operation received by the switching operation portion.

Still another aspect of the present invention is spectacles including a pair of left and right members, in which the above-mentioned position adjustment mechanism is used as a position adjustment mechanism that adjusts positions of the pair of left and right members in a left-right direction.

According to the present spectacles, both when adjusting by moving the positions of all members (the moved members) of the pair of left and right members constituting the spectacles at once, and when adjusting by moving the positions of only part of the moved members of the pair of left and right members, the adjusting operation portion operated by the user is the same, thus it is possible to provide a high level of convenience to the user.

In the foregoing spectacles, the pair of left and right members are a pair of left and right ophthalmic lens portions.

According to this, both when adjusting by moving the positions of both the left and right ophthalmic lens portions at once, and when adjusting by moving the position of only one of the left and right ophthalmic lens portions, the adjusting operation portion operated by the user is the same, thus it is possible to provide a high level of convenience to the user.

Advantageous Effects of Invention

According to the present invention, the spectacle frame includes the pair of left and right threaded portions in which the shaft portions rotatably supported by the bridge portion are formed with ridges in opposite directions to each other, and by the position adjustment portion of the lens-holding portions holding the lenses screws into the threaded portions, the distance between the lenses can be adjusted by rotating the shaft portion.

Also, according to the present invention, both when adjusting by moving the positions of all the moved members at once, and when adjusting by moving the positions of only part of the moved members, the adjusting operation portion operated by the user is the same, thus it is possible to provide a high level of convenience to the user.

DESCRIPTION OF EMBODIMENTS

Embodiment 1

Hereinafter, an embodiment (hereinafter, this embodiment will be referred to as "embodiment 1") of the present invention will be described with reference to the drawings.

Figure 1:
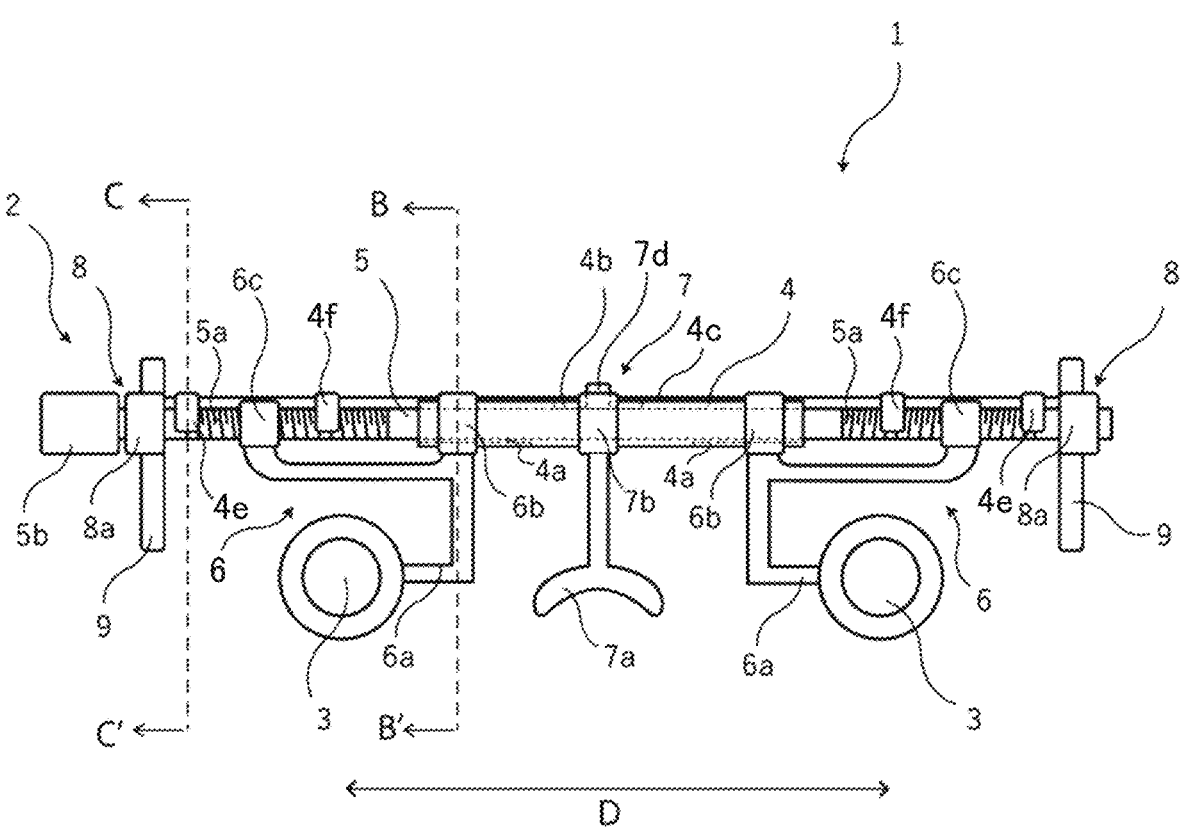
FIG. 1 is a front view showing a configuration of spectacles in an embodiment 1.
Figure 2:
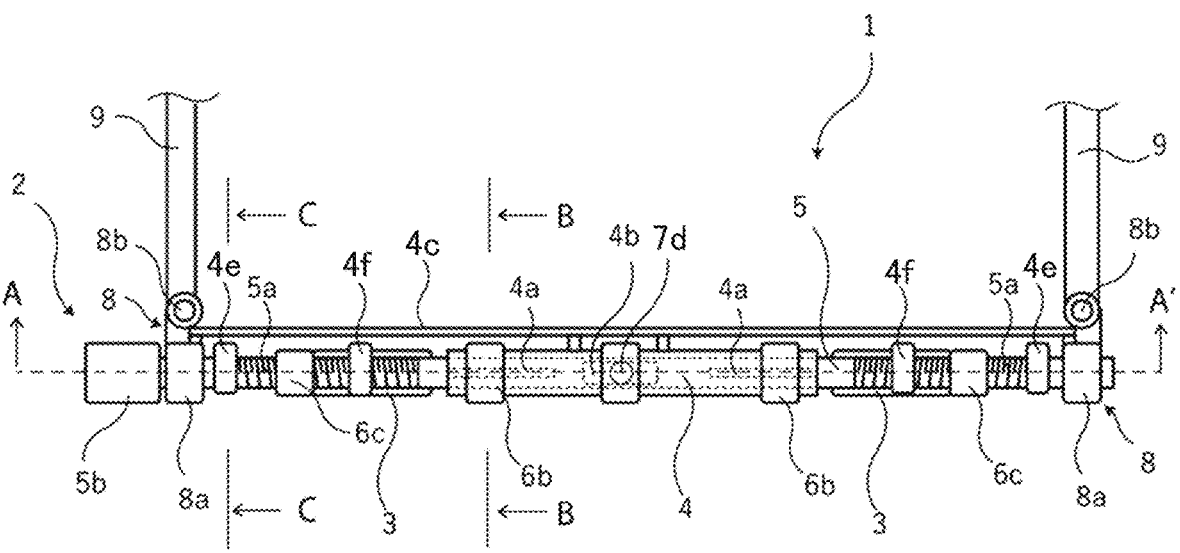
FIG. 2 is a plan view showing the configuration of the spectacles.

FIG. 1 is a front view showing a configuration of spectacles 1 according to an example of the embodiment 1, and FIG. 2 is a plan view showing the configuration of the spectacles according to the example of the embodiment 1.

Figure 3:
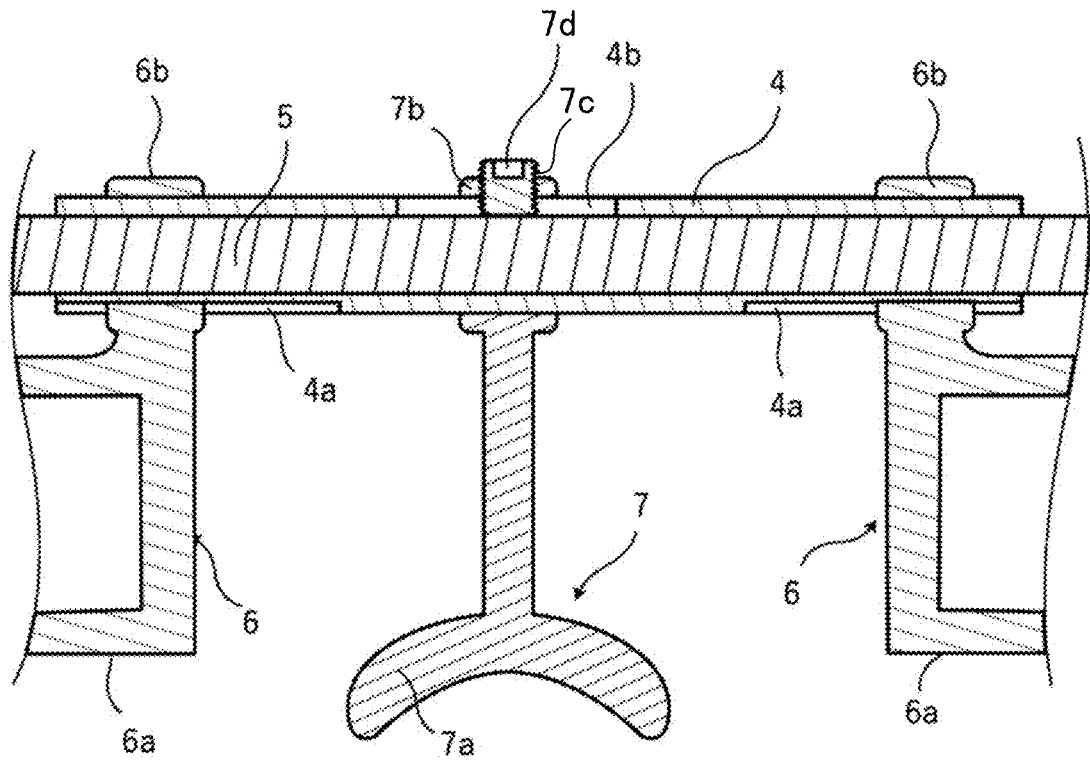
FIG. 3 is a cross-sectional view taken along a line A-A' of a bridge portion included in the spectacles.
Figure 4:
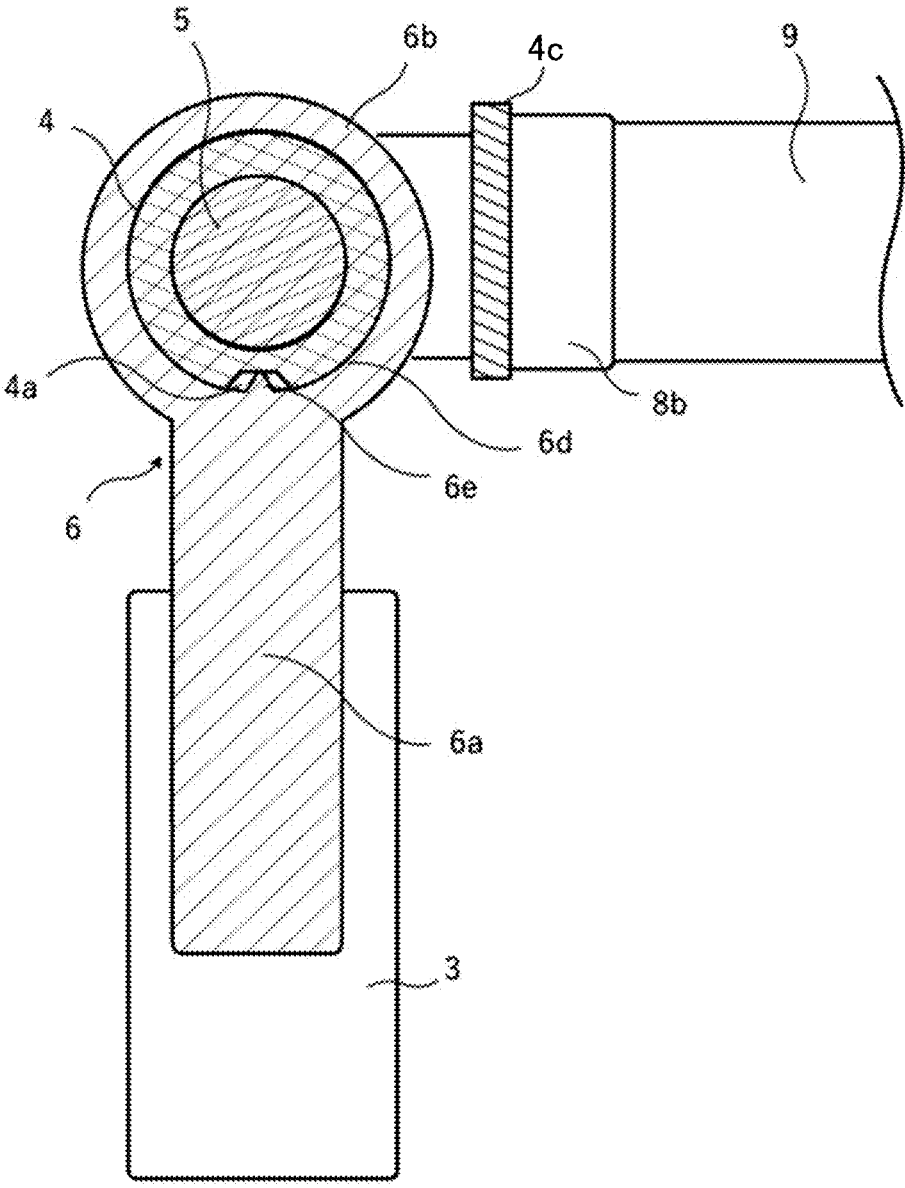
FIG. 4 is a cross-sectional view taken along a line B-B' of a sliding portion of a lens-holding portion included in the spectacles.
Figure 5:
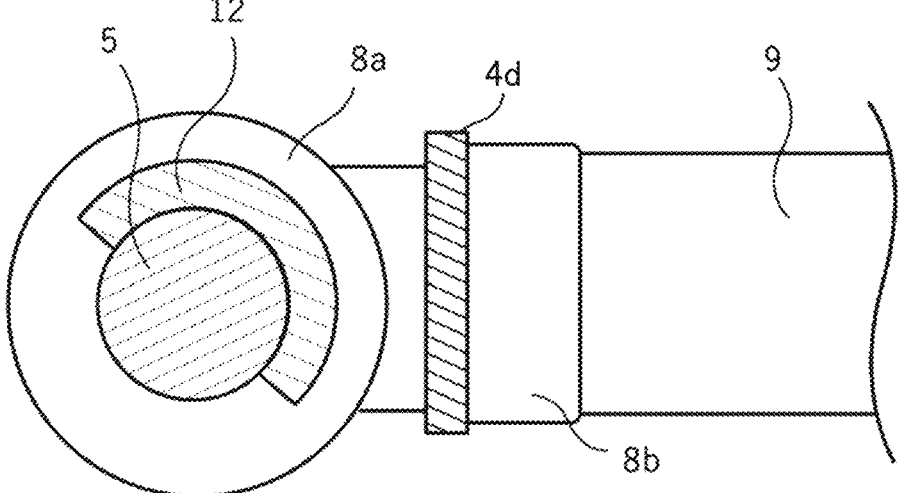
FIG. 5 is a cross-sectional view taken along a line C-C' of a position holding portion included in the spectacles.

Further, FIG. 3 is a cross-sectional view taken along a line A-A' of a bridge portion 4, FIG. 4 is a cross-sectional view taken along a line B-B' of a sliding portion 6b included in the lens-holding portion 6, and FIG. 5 is a cross-sectional view taken along a line C-C' of a position holding portion 4e.

As shown in FIG. 1 and FIG. 2, the spectacles 1 in an example of the embodiment 1 are eyeglasses that are composed of a spectacle frame 2 and a pair of left and right variable focus lenses 3. The variable focus lens 3 in an example of the embodiment 1 is specifically a variable focus lens with a diameter of about 5 mm to about 12 mm, and is a lens whose focal length can be changed according to an applied voltage.

The spectacle frame 2 includes a bridge portion 4, a shaft portion 5, a pair of left and right lens-holding portions 6, a nose-pad portion 7, a pair of left and right endpiece portions 8, temple portions 9, a fixing portion 7d, a bridge support portion 4c, and position holding portions 4e and 4f.

The bridge portion 4 is a member located near the center of the spectacle frame 2 in the left-right direction. The bridge portion 4 in an example of the embodiment 1 is a substantially cylindrical member in which slide grooves 4a and a fixing hole 4b are formed, and is connected to the endpiece portions 8 by a bridge support portion 4c, which will be described later.

The slide grooves 4a are grooves provided at the lower parts of the left and right ends of the bridge portion 4. As shown in FIG. 4, ribs 6e projecting upward are provided on the lower end sides of inner walls 6d of sliding portions 6b of the lens-holding portions 6, which will be described later, and the ribs 6e and the slide grooves 4a allow the lens-holding portions 6 to be supported by the bridge portion 4 so as to be movable in the left-right direction while not being able to rotate around an axis of the shaft portion 5.

The fixing hole 4b is a hole through which a fixing portion 7d, which will be described later, is inserted. As shown in FIG. 3, the fixing hole 4b in an example of the embodiment 1 is a hole whose width in the left-right direction is approximately 10 mm and whose width in a front-rear direction is approximately the same length as an outer diameter of the fixing portion 7d.

As will be described later, the fixing portion 7d is screwed into the screw hole 7c of the nose-pad fixing portion 7b of the nose-pad portion 7, passes through the fixing hole 4b, and comes into contact with the shaft portion 5. The width of the fixing hole 4b in the front-rear direction is approximately the same as the outer diameter of the fixing portion 7d, and the nose-pad portion 7 into which the fixing portion 7d is screwed can move within a range of approximately 10 mm in the left-right direction, while cannot rotate in a direction around the axis of the bridge portion 4.

The shaft portion 5 is a member that is inserted through the bridge portion 4 described above and the left and right endpiece portions 8 described later, and is held by the bridge portion 4 so as to be rotatable around the axis. The shaft portion 5 in an example of the embodiment 1 is a cylindrical member with a diameter of approximately 4 mm, and has a pair of left and right threaded portions 5a and a dial portion 5b on one end side in the left-right direction (a left end side in FIG. 1 and FIG. 2) of the shaft portion 5.

The threaded portions 5a are external threads provided on the shaft portion 5 at positions corresponding to above the variable focus lenses 3. In an example of the embodiment 1, as described above, the shaft portion 5 is the cylindrical member with the diameter of approximately 4 mm, and the threaded portions 5a are formed by external threads arranged on the cylindrical member with a pitch of approximately 0.5 mm, an effective diameter of approximately 3.675 mm and a minor diameter of approximately 3.459 mm.

Furthermore, the threaded portions 5a are formed such that one threaded portion 5a and the other threaded portion 5a have opposite threads, that is, ridges in opposite directions. In an example of the embodiment 1, one threaded portion 5a on the left side when viewed from a front is formed to have a right-hand thread, the other threaded portion 5a on the right side when viewed from the front is formed to have a left-hand thread, thereby the left and right threaded portions 5a are configured to have opposite threads.

The dial portion 5b is provided on one end side of the shaft portion 5, and is a part for pinch when a wearer of the spectacles 1 rotates the shaft portion 5. The dial portion 5b in an example of the embodiment 1 is formed in a substantially cylindrical shape with a diameter of approximately 6 mm provided at one end side of the shaft portion 5.

The lens-holding portions 6 are members that hold the variable focus lenses 3. The lens-holding portions 6 in an example of the embodiment 1 include lens-holding members 6a that hold the variable focus lenses 3, and sliding portions 6b and position adjustment portions 6c provided on the lens-holding members 6a.

The sliding portions 6b are members that hold the lens-holding portions 6 on the bridge portion 4 described above. The sliding portions 6b in an example of the embodiment 1 are annular members provided at a center side of an upper end of the lens-holding members 6a, and as shown in FIG. 4, ribs 6e projecting upward are provided on the lower end sides of the inner walls 6d of the sliding portions 6b. The lens-holding portions 6 are supported by the bridge portion 4 so as to be slidable in the left-right direction by fitting the ribs 6e into the slide grooves 4a.

The position adjustment portions 6c are members that constitute internal threads into which the pair of left and right threaded portions 5a of the shaft portion 5 described above screw. Since the lens-holding portions 6 are supported by the sliding portions 6b so as to be movable in the left-right direction on the bridge portion 4, when the shaft portion 5 is rotated around the axis while the position adjustment portions 6c are screwed with the threaded parts 5a, the position adjustment portions 6c and the lens-holding portions including the position adjustment portions 6c move in the left-right direction. In an example of the embodiment 1, the left and right threaded portions 5a of the shaft portion 5 are formed such that the left threaded portion 5a when viewed from the front is a right-hand thread, and the right threaded portion 5a when viewed from the front is a left-hand thread. With this configuration, when the shaft portion 5 is rotated toward the right, i.e., clockwise in a left side view, each of the pair of left and right lens-holding portions 6 moves toward the left and right end sides, thereby a distance between the lens-holding portions 6, i.e., an inter-lens distance D increases. On the other hand, when the shaft portion 5 is rotated toward the left, i.e., counterclockwise in the left side view, each of the pair of left and right lens-holding portions 6 moves toward the center of the spectacles 1 in the left-right direction, and the inter-lens distance D decreases.

The nose-pad portion 7 is a member that is held by the bridge portion 4 and comes into contact with the wearer's nose when wearing the spectacles 1 to fix an up and down position of the spectacles 1 when viewed from the front. In an example of the embodiment 1, the nose-pad portion 7 includes a nose-pad body 7a that comes into contact with the wearer's nose, and a nose-pad fixing portion 7b provided on the upper end side of the nose-pad body 7a.

The nose-pad fixing portion 7b is a member that connects the nose-pad portion 7 to the bridge portion 4, and is formed in a substantially ring shape that can slide in the left-right direction on the outer circumference of the bridge portion 4 and can rotate around the axis.

The nose-pad fixing portion 7b in an example of the embodiment 1 is provided with a screw hole 7c, and when the fixing portion 7d described later is screwed into the screw hole 7c and inserted into the fixing hole 4b of the bridge portion 4 described above and further brought into contact with the shaft portion 5, the bridge portion 4, the shaft portion 5 and the nose-pad portion 7 are fixed.

The endpiece portions 8 are members that connects the shaft portion 5 described above and the temple portion 9 described later. The endpiece portions 8 in an example of the embodiment 1 include shaft support portions 8a that rotatably support the shaft portion 5, and hinge portions 8b that pivotally support the temple portions 9.

Furthermore, the endpiece portions 8 in an example of the embodiment 1 are connected to the bridge portion 4 by the bridge support portion 4c described later.

The temple portions 9 are members for hanging the spectacle frame 2 on ears of the wearer. In an example of the embodiment 1, the temple portions 9 are pivotally supported by the hinge portions 8b provided in the above-mentioned endpiece portions 8, and configured so that the temple portions 9 can be folded toward the center in the left-right direction with the up-down direction of the spectacle frame 2 as an axis.

The fixing portion 7d is a member that fixes the bridge portion 4, the shaft portion 5 and nose-pad portion 7, which will be described above. The fixing portion 7d in an example of the embodiment 1 is specifically a so-called set screw, that is, a substantially cylindrical member having a thread formed on its outer periphery. As described above, the fixing hole 4b provided in the bridge portion 4 has a width in the front-rear direction that is approximately the same as the outer shape of the fixing portion 7d, and a width in the left-right direction of approximately 20 mm. By inserting the fixing portion 7d into the fixing hole 4b, the nose-pad portion 7 is supported by the bridge portion 4 so as to be movable approximately 20 mm in the left-right direction.

When the lower end side of the fixing portion 7d is brought into contact with the shaft portion 5 by tightening the fixing portion 7d, the shaft portion 5 is pressed against the inner wall of the bridge portion 4 by the fixing portion 7d, and a rotation of the shaft portion 5 around the axis is fixed by friction with the fixing portion 7d and the inner wall of the bridge portion 4. As described above, in an example of the embodiment 1, by rotating the shaft portion 5, a distance between the pair of lens-holding portions 6 and a distance between the pair of variable focus lenses 3 held by the pair of lens-holding portions 6 can be increased or decreased, and by fixing the shaft portion 5 with the fixing portion 7d, the inter-lens distance D can be kept in a fixed state. On the other hand, by loosening the fixing portion 7d, the shaft portion 5 becomes rotatable around the axis, and by the wearer pinching the dial portion 5b and rotating the shaft portion 5, the inter-lens distance D can be adjusted in an increased or decreased direction. This means that by pinching the dial portion 5b and rotating the shaft portion 5, the wearer can adjust the respective positions of the pair of left and right lens-holding portions 6 with respect to a predetermined reference position (for example, the center point of the shaft portion 5).

The bridge support portion 4c is a member that connects the pair of left and right endpiece portions 8 and the bridge portion 4. The bridge support portion 4c in an example of the embodiment 1 is a plate-like member formed in a substantially rectangular shape when viewed from the front, and both end sides thereof in the left-right direction are connected to the pair of left and right endpiece portions 8, and a center thereof is connected to the bridge portion 4.

As described above, in an example of the embodiment 1, the shaft portion 5 is supported by the bridge portion 4 and the shaft support portions 8a of the endpiece portions 8 so as to be rotatable around the axis, but when the rotation of the shaft portion 5 around the axis is fixed by the fixing portion 7d, the bridge portion 4 and the endpiece portions 8 are connected by the bridge support portion 4c, so that the rotation of the endpiece portions 8 and the shaft portion 5 around the axis is also fixed.

The position holding portions 4e and 4f are members that limit a range of adjustment of the distance between the pair of left and right lens-holding portions 6 on the shaft portion 5 and the distance between the pair of variable focus lenses 3 held by the lens-holding portions 6. In an example of the embodiment 1, for each of the pair of left and right lens-holding portions 6, the position holding portions 4e for a far-vision and the position holding portions 4f for near-vision are provided. As shown in FIG. 5, the position holding portions 4e and 4f in an example of the embodiment 1 are members that are made of resin, rubber, or other elastic material and formed a substantially arc shape when viewed from the side, and are configured so that they can be stopped at any position on the shaft portion 5.

The position holding portions 4e and 4f are members that function as stoppers that limit movement of the lens-holding portions 6 in the left-right direction. The spectacles 1 in an example of the embodiment 1 use the variable focus lenses 3 as the lenses, and a focus can be changed depending on a distance between the wearer and a view object. At this time, it is desirable that the variable focus lenses 3 are placed in a straight-line connecting pupils of the wearer and the view object, and it is assumed to adjust so that the inter-lens distance D between the pair of variable focus lenses 3 is long for far-vision and short for near-vision.

In the far-vision state, the position holding portions 4e for far-vision are stopped at a position where they contact the position adjustment portions 6c of the lens-holding portions 6, and in the near-vision state, the position holding portions 4f for near-vision are stopped at a position where they contact the position adjustment portions 6c of the lens-holding portions 6, so that it is possible to easily change and/or adjust the inter-lens distance D for far-vision and the inter-lens distance D for near-vision.

On the other hand, the position holding portions 4e for far-vision are storage portions that store lens positions corresponding to a pupillary distance of the wearer during the far-vision, and once the position holding portions 4e for far-vision are placed and fixed, it becomes possible to easily reproduce and adjust the lens positions corresponding to the pupillary distance during the far-vision just by operating the dial portion, without wearing glasses. Similarly, the position holding portions 4f for near-vision are storage portions that store lens positions corresponding to a pupillary distance of the wearer during the near-vision, and once the position holding portions 4f for near-vision are placed and fixed, it becomes possible to adjust the lens positions corresponding to the pupillary distance during the near-vision just by operating the dial portion, without wearing glasses. Espe-cially, in the position holding portions 4e and 4f as storage portions, there are some problems such that in order to change and/or adjust the pupillary distance for the far-vision and the near-vision, it may be necessary to wear variable focus lenses and adjust the pupillary distance, which may not be easy to adjust, but by using the above storage portions, it becomes easy to conveniently change and adjust the pupillary distance without wearing again. Such storage portions are not limited to the holding member of the embodiment 1, and it is also suitable to electronically store coordinate values and the like for electronic control.

As described above, the embodiment 1 is the pair of spectacles including the pair of left and right lenses and the spectacle frame, in which at least one of the pair of left and right lenses is the variable focus lens, and a mechanism for adjusting the distance between the left and right lenses is provided, and further the spectacles are an eyewear that is equipped with the storage portion that stores the lens posi-tions corresponding to the pupillary distance for far-vision of the wearer and the lens positions corresponding to the pupillary distance for near-vision of the wearer, so that it becomes possible to conveniently change and adjust the lens positions corresponding to the pupillary distance for the far-vision and the near vision.

As in the embodiment 1, this storage portion is preferably a member (e.g., the position holding portions 4e, 4f) that limits a range of adjustment of the distance between the left and right lenses.

Furthermore, instead of adjusting the distance between the left and right lenses, a distance between optical axes of the left and right lenses may be adjusted while the lens positions are fixed. For example, by using functions of the variable focus lenses 3, 3, a configuration may be adopted in which positions of the optical axes of the left and right lenses can be changed and adjust to positions corresponding to the pupillary distance for the far-vision of the wearer and positions corresponding to the pupillary distance for the near-vision of the wearer.

Embodiment 2

Next, an embodiment (hereinafter, this embodiment will be referred to as "embodiment 2") in which the present invention is applied to a position adjustment mechanism for a pair of left and right ophthalmic lens portions in spectacles will be described.

In the embodiment 2, the position adjustment mechanism for the pair of left and right ophthalmic lens portions in the spectacles will be explained as an example, but as long as it is a pair of left and right members provided on spectacles, it is not limited to the pair of left and right ophthalmic lens portions, and it is also possible to apply the present invention to a pair of left and right temple portions, a pair of left and right pad portions of a nose-pad portion, and the like. Furthermore, it is not limited to spectacles, and can be similarly applied to a position adjustment of a paired mem-bers as long as the article includes paired members (a pair of moved members).

Further, in the following description, an example in which the ophthalmic lens portions are variable focus lenses will be described, but it is not limited to this, and there are no specific restrictions on configurations of the ophthalmic lens portions. However, if the ophthalmic lens portions are small (for example, the ophthalmic lens portions whose effective lens diameters are less than or equal to corneal diameters of the wearer's eyes), it may be necessary to frequently adjust the positions according to positions of the respective eyes of the wearer (for example, positions of the eyes approaching and separating from each other due to convergence), there-fore it is particularly useful in such small ophthalmic lens portions.

Figure 6:
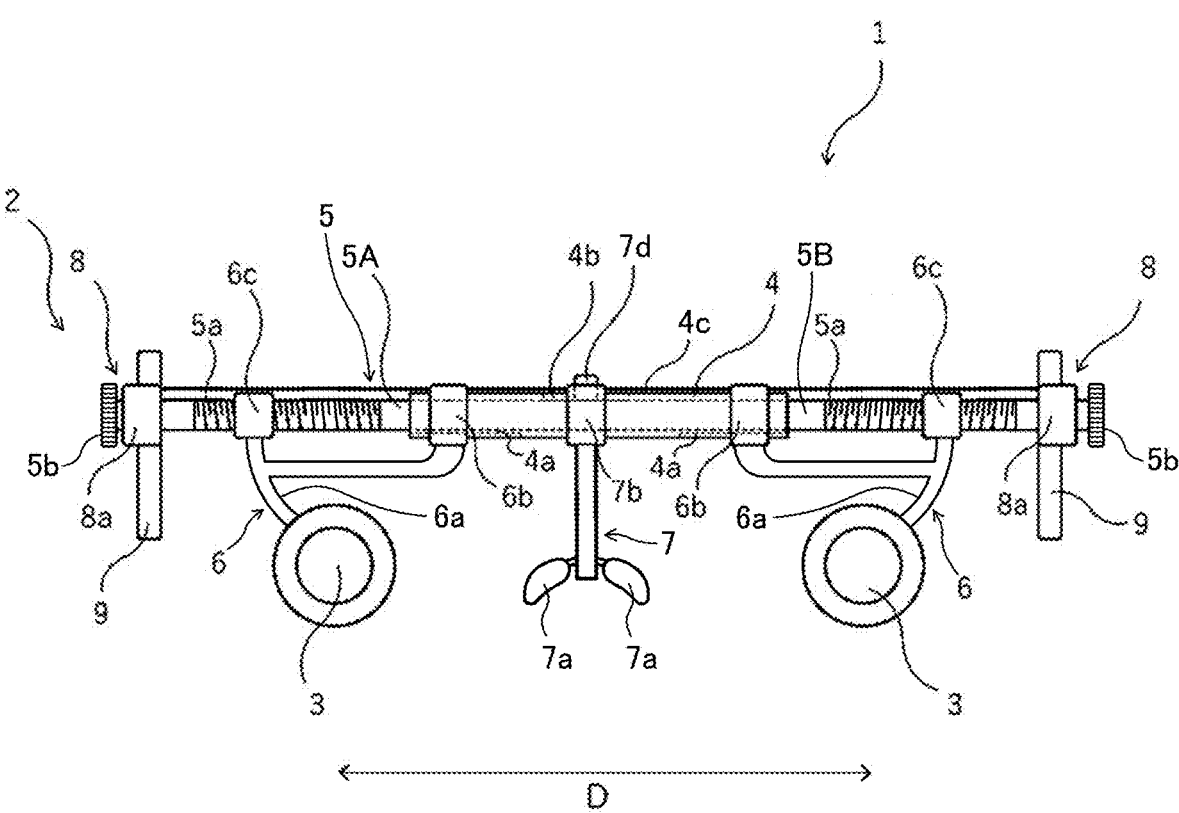
FIG. 6 is a front view schematically showing a configuration of spectacles according to an embodiment 2.
Figure 7:
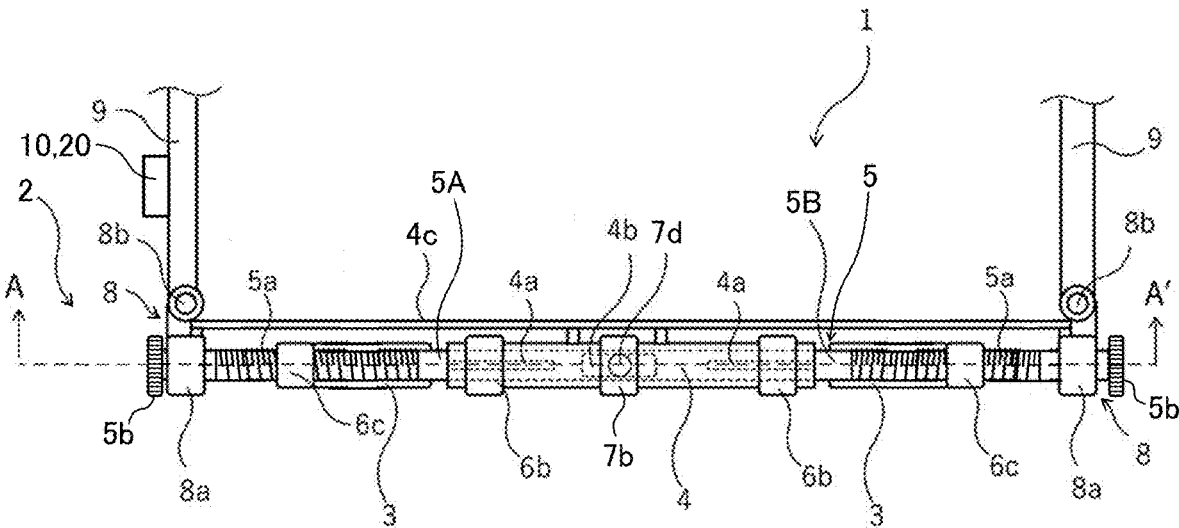
FIG. 7 is a plan view schematically showing the configuration of the spectacles.
Figure 8:
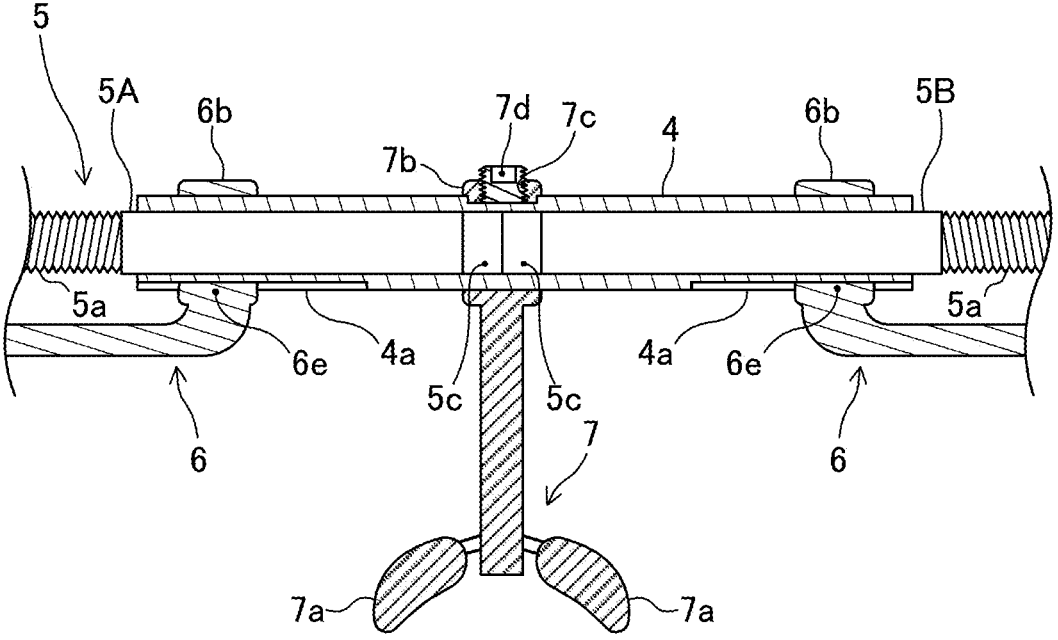
FIG. 8 is a cross-sectional view showing a part of the A-A' cross section of a bridge portion of the spectacles.

FIG. 6 is a front view schematically showing a configu-ration of the spectacles 1 according to the embodiment 2, FIG. 7 is a plan view schematically showing the configu-ration of the spectacles 1 according to the embodiment 2, and FIG. 8 is a cross-sectional view showing a part of the A-A' cross section of a bridge portion of the spectacles 1 according to the embodiment 2.

The spectacles 1 according to the embodiment 2 include a spectacle frame 2, a pair of left and right variable focus lenses 3, 3 as ophthalmic lens portions, and a control apparatus 10 as a lens control apparatus that controls a focal length of the variable focus lenses 3, 3.

The spectacle frame 2 includes a bridge portion 4, a shaft portion 5, a pair of left and right lens-holding portions 6, 6, a nose-pad portion 7, a pair of left and right endpiece portions 8, 8, and a pair of left and right temple portions 9, 9.

The bridge portion 4 is a member that is located near a center in the left-right direction of the spectacle frame 2 and supports the left and right lens-holding portions 6, 6 that hold the variable focus lenses 3, 3. The bridge portion 4 in the embodiment 2 is constituted by a substantially cylindri-cal member extending in the left-right direction.

On a bottom of the bridge portion 4, slide grooves 4a, 4a are formed to extend in the left-right direction from each end in the left-right direction. These slide grooves 4a, 4a are provided for sliding respective sliding portions 6b, 6b of the pair of left and right lens-holding portions 6, 6 so as to be movable in the left-right direction. Specifically, each of the sliding portions 6b, 6b of the pair of left and right lens-holding portions 6, 6 is provided with ribs 6e, 6e that project upward on a bottom inner wall thereof, and is supported by the bridge portion 4 in a state that the pair of left and right lens-holding portions 6, 6 are movable in the left-right direction while the ribs 6e, 6e are guided by respective slide grooves 4a, 4a.

Furthermore, on near a center of a top of the bridge portion 4 in the left-right direction, a fixing groove 4b is formed. This fixing groove 4b is a groove into which a fixing screw portion 7d for fixing a nose-pad fixing portion 7b of the nose-pad portion 7 to the bridge portion 4 is inserted. A length of the fixing groove 4b in the embodiment 2 is, for example, approximately 10 mm in the left-right direction, and a length in the front-rear direction is approximately the same length as an outer diameter of the fixing screw portion 7d. The fixing screw portion 7d is screwed into a screw hole 7c formed in the nose-pad fixing portion 7b of the nose-pad portion 7, and its lower end comes into contact with a bottom surface of the fixing groove 4b of the bridge portion 4, so that the nose-pad portion 7 is fixed to the bridge portion 4. Note that the nose-pad portion 7 can be moved in its left-right position within a range of a left-right length of the fixing groove 4b of the bridge portion 4 (for example, within a range of approximately 10 mm).

Further, in a rear side of the bridge portion 4 in the front-rear direction (upper side in an up-down direction in FIG. 7), a bridge support portion 4c that is elongated in the left-right direction is attached. Both ends of the bridge support portion 4c are fixed to the pair of left and right endpiece portions 8, 8, respectively. Thereby, a left-right position of the bridge portion 4 is fixed and arranged at approximately a center between the pair of left and right endpiece portions 8, 8.

The shaft portion 5 in the embodiment 2 is composed of shaft members 5A and 5B as two moving portions coaxially arranged with each other. The two shaft members 5A and 5B are, for example, cylindrical members with a diameter of approximately 4 mm. Each inner side part of the two shaft members 5A and 5B in the left-right direction is inserted into the bridge portion 4 and is supported by the bridge portion 4 in a freely rotatable state around an axis. In addition, each of outer ends of the two shaft members 5A and 5B in the left-right direction is supported by the pair of left and right endpiece portions 8, 8 in a freely rotatable state around each axis, respectively, and extends to outsides of the respective endpiece portions 8, 8 in the left-right direction. Further, in the two shaft members 5A and 5B, ridges 5a, 5a are formed on an outer surface part between the bridge portion 4 and each endpiece portion 8, 8. The respective ridges 5a, 5a of the two shaft members 5A and 5B are configured such that screw directions are opposite to each other between the two shaft members 5A and 5B, that is, the screw threads have a relation to opposite threads to each other.

The two shaft members 5A and 5B are provided with dial portions 5b, 5b, which function as adjusting operation portions or switching operation portions, at each end extending from each endpiece portion 8. When the wearer performs an operation of pinching and turning the dial portions 5b, 5b (adjusting operation), the two shaft members 5A and 5B that are rotatably supported by the bridge portion 4 and the endpiece portions 8, 8 rotate around the axis by a rotational force (operating force) of the dial portions 5b, 5b. The dial portions 5b, 5b in the embodiment 2 are configured, for example, in a substantially disk shape with a diameter of approximately 6 mm.

The lens-holding portions 6, 6 in the embodiment 2 include lens-holding members 6a, 6a that hold the variable focus lenses 3, 3, the sliding portions 6b, 6b that hold the lens-holding members 6a, 6a slidably on the bridge portion 4, and screw moving portions 6c, 6c that engage with the ridges 5a, 5a of each shaft member 5A, 5B and move in an axial direction of each shaft member 5A, 5B by an axial rotation of each shaft member 5A, 5B.

The lens-holding members 6a, 6a are constituted by members of elongated shape (linear shape), and tips thereof are connected to outer edge parts of the variable focus lenses 3, 3 to hold the variable focus lenses 3. Moreover, the sliding portions 6b, 6b are annular members into which the bridge portion 4 can be inserted, and the ribs 6e, 6e are provided on inner walls of bottom parts thereof. The respective ribs 6e, 6e of each sliding portion 6b, 6b are inserted into the corresponding slide groove 4a, 4a of the bridge portion 4, respectively. Further, the screw moving portions 6c, 6c are each provided with a thread groove that engages with the ridges 5a, 5a formed on the two shaft members 5A and 5B, and are screwed to the two shaft members 5A and 5B, respectively.

In the embodiment 2, connected positions of the variable focus lenses 3, 3 to which the lens-holding members 6a, 6a are connected, as shown in FIG. 6, are respectively located outside a vertical imaginary line passing through optical axes of the variable focus lenses 3, 3 (on sides far from a nose, that is, on ear sides), and above a horizontal imaginary line passing through the optical axes of the variable focus lenses 3, 3. By configuring the lens-holding members 6a, 6a to be connected to these positions, even if the lens-holding portions 6, 6 enter the wearer's field of view, it is difficult to feel that the lens-holding portions 6, 6 are a hindrance.

Figure 9:
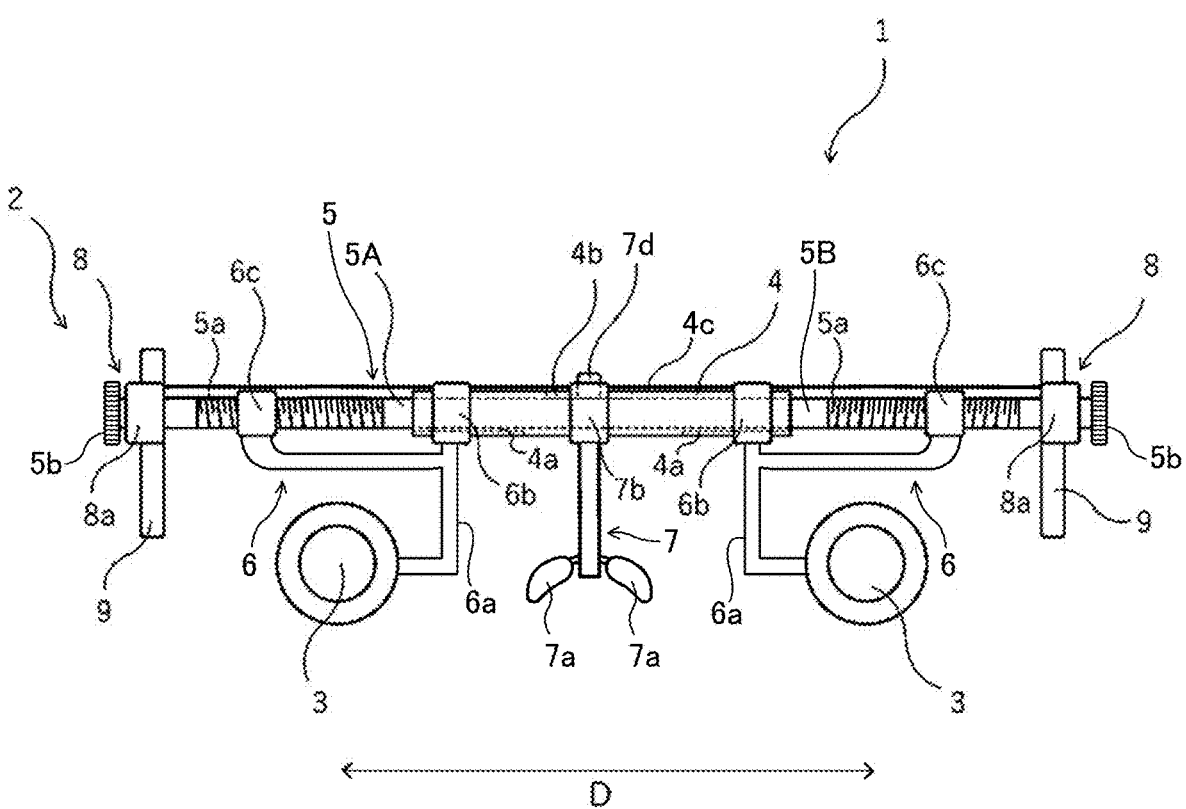
FIG. 9 is a front view schematically showing another configuration of spectacles according to the embodiment 2.

However, the connected positions of the variable focus lenses 3, 3 to which the lens-holding members 6a, 6a are connected are not limited to the positions of the embodiment 2, for example, as shown in FIG. 9, it may be placed inner side of the vertical imaginary line passing through the optical axes of the variable focus lenses 3, 3 (on the nose side).

The nose-pad portion 7 is a member that is held by the bridge portion 4 and comes into contact with the user's nose to determine a position of the spectacles 1 when the user wears the spectacles 1. The nose-pad portion 7 of the embodiment 2 includes a pair of left and right pad portions 7a, 7a that come into contact with the wearer's nose, and a nose-pad fixing portion 7b for holding and fixing the pad portions 7a, 7a to the bridge portion 4. The nose-pad fixing portion 7b has an annular part into which the bridge portion 4 can be inserted, and is attached to the bridge portion 4 in a state of slidable on an outer periphery of the bridge portion 4 in the left-right direction. In an upper part of the nose-pad fixing portion 7b, a screw hole 7c into which the fixing screw portion 7d is screwed is formed. By tightening the fixing screw portion 7d until a lower end thereof comes into contact with a bottom surface of the fixing groove 4b of the bridge portion 4, the nose-pad 7 can be fixed to the bridge portion 4.

The endpiece portions 8, 8 are members that connect the bridge portion 4 and the shaft portion 5 to the temple portions 9, 9. The endpiece portions 8, 8 in the embodiment 2 include shaft support portions 8a, which are attachment portions to which the bridge portion 4 and the shaft portion 5 are attached, and hinge portions 8b, which rotatably support the temple portions 9, 9.

The temple portions 9, 9 are members that are hung on the user's ears when the user wears the spectacles 1. The left and right temple portions 9, 9 in the embodiment 2 are configured such that they can be folded toward a center in the left-right direction of the spectacles 1 by hinge portions 8b provided in the endpiece portions 8, 8, respectively.

The variable focus lenses 3, 3 in the embodiment 2 are not limited to this configuration as long as they have a function of electrically controllable change in focal length. However, it is preferable that the variable focus lenses 3, 3 are variable-shape lenses in which the focal length changes by changing a shape of the refractive surface. Among variable-shape lenses, liquid lens (also called electrowetting device, etc.) that uses an interface between two types of liquid as the refractive surface and can change the focal length by electrically controlling the wettability of the liquid and changing a shape of the interface is preferable. With the liquid lens, the focal length can be controlled at high speed and with a high flexibility.

The variable focus lenses 3, 3 of the embodiment 2 adopt the liquid lens whose effective lens diameter is less than or equal to a corneal diameter of the wearer's eye, specifically, the liquid lens whose effective lens diameter (diameter) is about 5 mm to 12 mm. Note that by using a larger variable focus lens, a range of the user's line of sight that can be covered by the variable focus lens is expanded, and user convenience can be improved.

Figure 10:
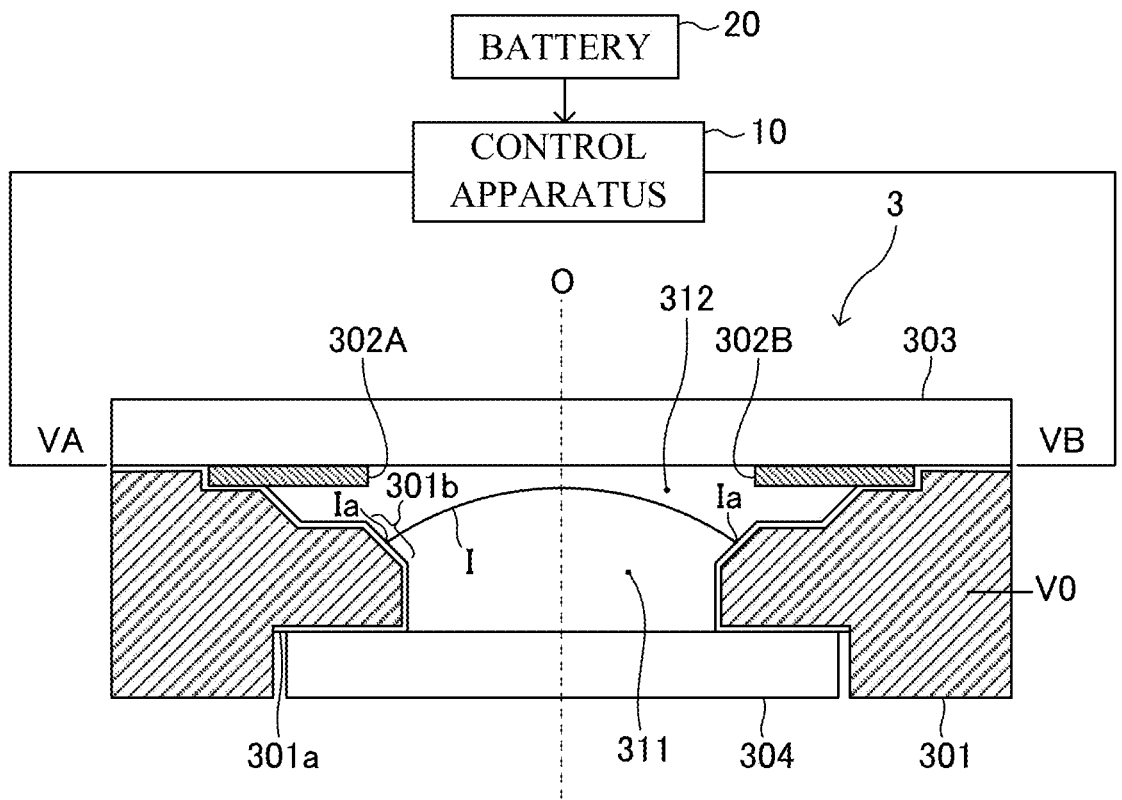
FIG. 10 is a cross-sectional view showing a schematic configuration of a variable focus lens in the spectacles according to the embodiment 2.

FIG. 10 is a cross-sectional view showing a schematic configuration of the variable focus lens 3 in the embodiment 2.

Figure 11:
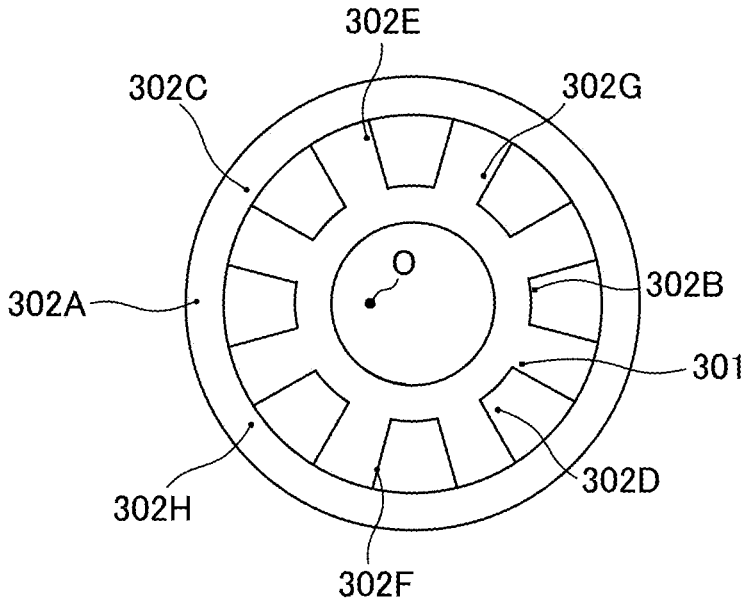
FIG. 11 is a plan view showing a schematic configuration of a variable focus lens in the spectacles.

FIG. 11 is a plan view showing a schematic configuration of the variable focus lens 3 in the embodiment 2.

As shown in FIG. 10, the variable focus lens 3 of the embodiment 2 has a configuration in which an insulating liquid 311 and a conductive liquid 312, which are in contact with each other in an unmixed state at an interface I, are enclosed by an annular first electrode 301 and two transparent window members 303 and 304 that close upper and lower ends of the first electrode 301. The insulating liquid 311 is, for example, an oil-based liquid, and the conductive liquid 312 is, for example, an aqueous liquid with relatively low conductivity. A voltage V0 is applied to the first electrode 301, but in the embodiment 2, since the annular first electrode 301 is grounded, the voltage V0 is equal to 0V. Further, the first electrode 301 is insulated from the insulating liquid 311 and the conductive liquid 312 sealed therein by an insulating layer 301a.

Further, in the variable focus lens 3 of the embodiment 2, a plurality of pairs of second electrodes 302A, 302B, . . . are arranged at symmetrical positions with respect to an axis O of the first electrode 301. In the embodiment 2, as shown in FIG. 11, four pairs of second electrodes 302A to 302H are arranged on a circumference centered on the axis O, and a total of eight second electrodes 302A to 302H are provided.

The second electrodes 302A to 302H are arranged at positions in contact with the conductive liquid 312, as shown in FIG. 10. When voltages VA to VH are applied to each of the second electrodes 302A to 302H, a potential difference is generated between each of the second electrodes 302A to 302H and the first electrode 301, and due to the electrowetting effect, an end part Ia of the insulating liquid 311 (an end part Ia of the interface I) can be displaced along an insulating layer part 301b on the first electrode 301. By displacing the end part Ia of the insulating liquid 311 in this way, a shape of the insulating liquid 311 changes and a curvature of the interface I changes. Therefore, by controlling the voltages VA to VH applied to the second electrodes 302A to 302H, it is possible to change the focal length of the variable focus lens 3 whose refractive surface is the interface I.

In particular, in the variable focus lens 3 of the embodiment 2, by controlling the voltages VA to VH applied to the second electrodes 302A to 302H, the interface I, which is the refractive surface, can be transformed to a diffusing lens (concave lens), a plane lens, or a condensing lens (convex lens). Therefore, the spectacles 1 of the embodiment 2 can be used as spectacles for near-sighted users by making the variable focus lens 3 the diffusing lens (the concave lens), and be used as spectacles for far-sighted users by making the variable focus lens 3 the condensing lens (the convex lens).

The variable focus lens 3 of the embodiment 2 can change the focal length within a range of −15 D or more and +15 D or less in diopter conversion (reciprocal of focal length). By using the variable focal length lens 3 having such a wide range of change in focal length, for example, it is possible to accommodate users with low visual acuity such as low-vision.

In the embodiment 2, by applying the same voltage to all the second electrodes 302A to 302H arranged at symmetrical positions with respect to the axis O of the first electrode 301, the focal length can be changed while keeping an optical axis of the variable focus lens 3 aligned with the axis of the first electrode 301. On the other hand, by applying different voltages to each of the second electrodes 302A to 302H, it is possible not only to change the focal length but also to shift or tilt the optical axis of the variable focus lens 3. That is, the variable focus lens 3 of the embodiment 2 can change either or both the position and direction of the optical axis by controlling the applied voltages VA to VH.

As shown in FIG. 7, the control apparatus 10 is provided, together with a battery 20, in one of the left and right endpiece portions 8, 8 (the left endpiece 8 in the figure). The control apparatus 10 can control the focal length of the variable focus lens 3 by controlling a voltage applied from the battery 20 to each second electrode 302A to 302H of the variable focus lens 3.

Figure 12:
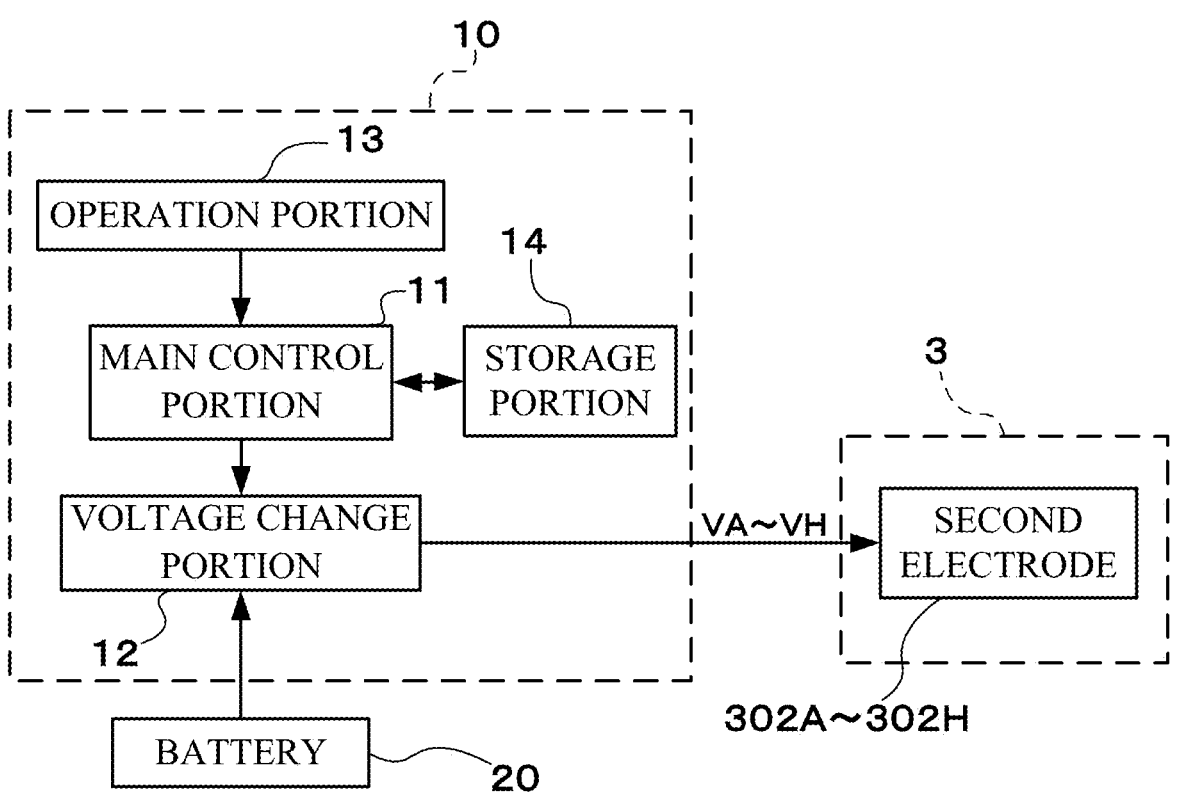
FIG. 12 is a block diagram showing a configuration of a control apparatus in the spectacles.

FIG. 12 is a block diagram showing a configuration of the control apparatus 10 in the embodiment 2.

The control apparatus 10 in the embodiment 2 includes a main control portion 11, a voltage change portion 12, an operation portion 13, and a storage portion 14. The control apparatus 10 is connected to the second electrodes 302A to 302H of the variable focus lenses 3 and the battery 20 as a power source for supplying voltage.

The main control portion 11 is, for example, constituted by a control board (computer) on which a CPU, RAM, ROM, etc. are mounted, and performs overall control of the spectacles 1, which is a spectacle lens apparatus, by executing a predetermined control program stored in the ROM. In particular, in the embodiment 2, the main control portion 11 functions as a control portion (control means) that controls the variable focus lenses 3 such that the focal length of the variable focus lenses 3, 3 changes based on an operation instruction received by the operation portion 13.

The voltage change portion 12 changes the voltage applied from the battery 20 to each of the second electrodes 302A to 302H of the variable focus lenses 3 under the control of the main control portion 11. The voltage change portion 12 can individually change the voltage applied to each of the second electrodes 302A to 302H for each of the second electrodes 302A to 302H. However, the voltage change portion 12 may be able to partially change only some of the second electrodes 302A to 302H (for example, only one pair of second electrodes).

The operation portion 13 is operated by the user to output an operation signal indicating an operation detail of the user to the main control portion 11, and does not include the dial portions 5b, 5b described above. Examples of user operations received by the operation portion 13 include a power on/off operation, an execution instruction for the main control portion 11, and a change of control detail of the main control portion 11. The operation portion 13 is configured with a type of operating device (such as a mechanical or electrostatic touch button, a rotary operation portion such as a dial, etc.) suitable for a detail of the user operation to be received. Note that it is also possible to adopt a configuration that does not require these user operations, and in that case, the operation portion 13 can be omitted.

The storage portion 14 stores programs and data used by the control apparatus 10. Particularly, in the embodiment 2, measurement information of the focal length of the variable focus lenses suitable for the user is stored as data used for controlling the focal length of the variable focus lenses 3, 3, which will be described later.

The battery 20 functions as the power source for the control apparatus 10 and outputs the voltage to be supplied to the second electrodes 302A to 302H of the variable focus lenses 3. The battery 20 may be a primary battery or a secondary battery. Alternatively, it may be equipped with a power generation function such as a solar panel.

In the embodiment 2, when the operation portion 13 receives a power-on operation by the user, a setting of a basic focal length of the variable focus lens 3 is executed if the setting of the basic focal length is not completed. Note that here, an example is given in which the power is turned on when the operation portion 13 receives the power-on operation by the user, but it is not limited to this, and for example, it may be configured such that by providing a wearing detection portion for detecting that the user wears the spectacles 1, the power is turned on by detecting that the user wears the spectacles 1.

The basic focal length can be arbitrarily set depending on a purpose of use by the user who uses the spectacles 1 (a distance at which the user sees a view object). For example, when the user uses the spectacles 1 for viewing a near view object (smartphone, tablet, game console, book, etc.), the basic focal length is set to the focal length that brings the near view object into focus, on the other hand, when the user uses the spectacles 1 for viewing a view object that is far away from the user (picture from far away (movies, etc.), appreciated object such as work of art, scenery, etc.), the basic focal length is set to the focal length that brings the far view object into focus.

Furthermore, the basic focal length may be set to a fixed focal length for each user, regardless of the purpose of use by the user who uses the spectacles 1. For example, if the user has eye abnormalities including refractive errors such as near-sightedness, far-sightedness, and astigmatism, the basic focal length is set to the focal length corresponding to the user's prescribed optical power (basic optical power). In this case, for example, in the case of a near-sighted user, the focal length corresponding to negative optical power is set as the basic focal length.

A setting work of the basic focal length can be performed by a specialized worker or the user himself by operating the operation portion 13. For example, if the operation portion 13 is provided with a dial on which optical power is written, the basic focal length can be set by turning the dial to match the user's prescribed optical power. In this case, an electrical signal (operation signal) corresponding to a rotational position of the dial is sent to the main control portion 11, and the main control portion 11 controls the voltage change portion 12 such that a voltage corresponding to this signal is applied to the second electrodes 302A to 302H of the variable focus lenses 3. As a result, the curvature of the interface I is changed by changing the shape of the interface I between the insulating liquid 311 and the conductive liquid 312 in the variable focus lenses 3, and the focal length of the variable focus lenses 3 is changed to the set basic focal length. Information on this basic focal length is stored in the storage portion 14 as measurement information on the focal length of the variable focus lenses 3, 3 suitable for the user.

Next, the operation of the position adjustment mechanism for the variable focus lenses 3, 3 in the embodiment 2 will be explained.

The position adjustment mechanism in the embodiment 2 is mainly composed of the bridge portion 4, the shaft portion 5, and the lens-holding portions 6, 6.

In the embodiment 2, the dial portion 5b on the right eye side of the wearer (the dial portion 5b on the left side in FIG. 6 and FIG. 7) is provided on the end of the shaft member 5A on the right eye side of the two shaft members 5A and 5B. That is, the rotational force (operating force) when the wearer turns the right-eye-side dial portion 5b is transmitted only to the right-eye-side shaft member 5A from the right-eye-side dial portion 5b. When the right-eye-side shaft member 5A rotates around the axis, the screw moving portion 6c on the right eye side moves in the left-right direction along the ridge 5a of the shaft member 5A, and as a result, the entire lens-holding portion 6 on the right eye side including the screw moving portion 6c moves in the left-right direction. At this time, the rib 6e of the sliding portion 6b constituting the lens-holding portion 6 is fitted into and guided by the slide groove 4a extending in the left-right direction of the bridge portion 4. Thereby, the lens-holding portion 6 can move in the axial direction of the shaft member 5A (in the left-right direction) in a state in which the rotation of the shaft member 5A around the axis is restricted.

In the embodiment 2, when the wearer turns the right-eye-side dial portion 5b in a direction in which an apex thereof moves toward the front side, the right-eye-side lens-holding portion 6 can be moved to the left side (nose side), and when the wearer turns the right-eye-side dial portion 5b in a direction in which the apex thereof moves toward the rear side, the right-eye-side lens-holding portion 6 can be moved to the right side (ear side). Furthermore, a moving amount (position in the left-right direction) of the right-eye-side lens-holding portion 6 can be adjusted by an amount of turning the right-eye-side dial portion 5b. Therefore, the wearer can adjust the position in the left-right direction of the right-eye-side variable focus lens 3 held in the right-eye-side lens-holding portion 6 by performing an operation (adjusting operation) of turning the right-eye-side dial portion 5b.

Similarly, the dial portion 5b on the left eye side of the wearer (the dial portion 5b on the right side in FIG. 6 and FIG. 7) is provided on the end of the shaft member 5B on the left eye side of the two shaft members 5A and 5B. That is, the rotational force (operating force) when the wearer turns the left-eye-side dial portion 5b is transmitted only to the left-eye-side shaft member 5B from the left-eye-side dial portion 5b. When the left-eye-side shaft member 5B rotates around the axis, the screw moving portion 6c on the left eye side moves in the left-right direction along the ridge 5a of the shaft member 5B, and as a result, the entire lens-holding portion 6 on the left eye side including the screw moving portion 6c moves in the left-right direction. At this time, the rib 6e of the sliding portion 6b constituting the lens-holding portion 6 is fitted into and guided by the slide groove 4a extending in the left-right direction of the bridge portion 4. Thereby, the lens-holding portion 6 can move in the axial direction of the shaft member 5B (in the left-right direction) in a state in which the rotation of the shaft member 5B around the axis is restricted.

In the embodiment 2, when the wearer turns the left-eye-side dial portion 5b in a direction in which an apex thereof moves toward the front side, the left-eye-side lens-holding portion 6 can be moved to the right side (nose side), and when the wearer turns the left-eye-side dial portion 5b in a direction in which the apex thereof moves toward the rear side, the left-eye-side lens-holding portion 6 can be moved to the left side (ear side). Furthermore, a moving amount (position in the left-right direction) of the left-eye-side lens-holding portion 6 can be adjusted by an amount of turning the left-eye-side dial portion 5b. Therefore, the wearer can adjust the position in the left-right direction of the left-eye-side variable focus lens 3 held in the left-eyeside lens-holding portion 6 by performing an operation (adjusting operation) of turning the left-eye-side dial portion 5*b*.

Here, in the embodiment 2, magnet portions 5*c*, 5*c* are provided at each end on inner side in the left-right direction of the two shaft members 5A and 5B. In the magnet portions 5*c*, 5*c*, as long as at least one of them is a magnet, if the other is a member having magnetism that can be attracted by a magnetic force of the magnet, it need not be a magnet.

As shown in FIG. 8, the respective magnet portions 5*c*, 5*c* in the two shaft members 5A and 5B are arranged to face each other in the axial direction of the shaft members 5A and 5B, and are connected by the magnetic force. As a result, the rotational force (operating force) transmitted from either the left or right dial portions 5*b*, 5*b* to the corresponding one shaft member 5A, 5B can also be transmitted to the other shaft member 5A, 5B (all-transmission state).

Therefore, for example, when the right-eye-side dial portion 5*b* receives a rotation operation (adjusting operation), the right-eye-side shaft member 5A is rotated around the axis by the rotational force (operation force), and the rotational force (operation force) is also transmitted to the left-eye-side shaft member 5B connected by the magnetic force of the magnet portions 5*c*, 5*c*, so that the left-eye-side shaft member 5B can also rotate. Similarly, for example, when the left-eye-side dial portion 5*b* receives a rotation operation (adjusting operation), the left-eye-side shaft member 5B is rotated around the axis by the rotational force (operation force), and the rotational force (operation force) is also transmitted to the right-eye-side shaft member 5A connected by the magnetic force of the magnet portions 5*c*, 5*c*, so that the right-eye-side shaft member 5A can also rotate.

Therefore, by performing the operation (adjusting operation) of turning one of the left and right dial portions 5*b*, the wearer can move and adjust the positions in the left and right direction of both the left and right variable focus lenses 3, 3 at once.

At this time, in the embodiment 2, the ridges 5*a*, 5*a* of the two shaft members 5A and 5B are formed in a relation to opposite threads with each other. Therefore, when an operation (adjusting operation) is performed to turn one of the left and right dial portions 5*b*, 5*b*, the respective positions of the left and right variable focus lenses 3, 3 are moved closer to each other or away from each other (in other words, in a direction of approaching and separating from each other).

In general, when a wearer views a near view object such as while reading a book, playing a game, or using a smartphone, the wearer's eyes move inward (toward the nose) due to convergence. When positions of both eyes change due to convergence, the relative positions of the variable focus lenses 3, 3 with respect to the eyes shift, and a wearer's visibility through the variable focus lenses 3, 3 reduces. Particularly, in the case of the small variable focus lenses 3, 3 as in the embodiment 2, when the positions of both eyes change due to convergence, even the relative position of each variable focus lens 3, 3 with respect to the eyes shifts slightly, the wearer's visibility through the variable focus lenses 3, 3 tends to reduce.

According to the embodiment 2, the wearer can move and adjust both positions in the left-right direction of the left and right variable focus lenses 3, 3 only by performing the operation (adjusting operation) of turning one of the left and right dial portions 5*b*. This means that the respective positions of the pair of left and right lens-holding portions 6 can be adjusted with respect to a predetermined reference position (for example, a center point of the shaft portion 5).

Therefore, for example, when the wearer switches the view object from a near object to a far object, or conversely from a far object to a near object, the positions of the left and right variable focus lenses 3, 3 can be adjusted easily and quickly, according to the positions of the eyes changed due to convergence.

On the other hand, there is a case where it is desired to adjust the left-right position of only one of the left and right variable focus lenses 3, 3. Particularly, in the case of the small variable focus lenses 3, 3 as in the embodiment 2, even the relative position of each variable focus lens 3, 3 with respect to the eyes shifts slightly, the wearer's visibility through the variable focus lenses 3, 3 tends to reduce. Therefore, it is desirable to individually adjust the left-right position of each variable focus lens 3, 3.

In the embodiment 2, when adjusting the left-right position of only the right-eye-side variable focus lens 3, the left-eye-side dial portion 5*b* functions as a switching operation portion, and the wearer performs a pinching operation (switching operation) to prevent the left-eye-side dial portion 5*b* from rotating. As a result, the rotation around the axis of the left-eye-side shaft member 5B is restricted. Therefore, when the wearer performs the operation (adjusting operation) to turn the right-eye-side dial portion 5*b*, even if the right-eye-side shaft member 5A rotates by the rotational force (operation force), although the magnet portions 5*c* and 5*c* connected by the magnetic force only slide against each other, the rotational force (operating force) is not transmitted to the left-eye-side shaft member 5B, and the left-eye-side shaft member 5B does not rotate around the axis (partial-transmission state). Therefore, the wearer performs the pinching operation (switching operation) to prevent the left-eye-side dial portion 5*b* from rotating, and then performs the operation (adjusting operation) to turn the right-eye-side dial portion 5*b*, so that the left-right position of only the right-eye-side variable focus lens 3 can be adjusted.

According to the embodiment 2, Whether the left-right positions of the left and right variable focus lenses 3, 3 are moved and adjusted at once or the left-right position of only the right-eye-side variable focus lens 3 is moved and adjusted, the wearer need only perform the same adjustment operation of turning the same right-eye-side dial portion 5*b*. As a result, compared to a configuration that requires operations on different operation portions when the left-right positions of the left and right variable focus lenses 3, 3 are moved and adjusted at once and the left-right position of only the right-eye-side variable focus lens 3 is moved and adjusted, it is possible to provide a high level of convenience to the wearer.

Note that, in the embodiment 2, the switching operation when moving and adjusting the left-right positions of the left and right variable focus lenses 3, 3 at once by the operation (adjusting operation) of turning the right-eye-side dial portion 5*b* is an operation (switching operation) in which the left-eye-side dial portion 5*b* as a switching operation portion is not pinched so as not to rotate.

In addition, in the embodiment 2, it is also possible to adjust the left-right position of only the left-eye-side variable focus lens 3. That is, in the embodiment 2, when adjusting the left-right position of only the left-eye-side variable focus lens 3, the right-eye-side dial portion 5*b*, which is as a first operation portion, functions as a switching operation portion, and the wearer performs a pinching operation (switching operation) to prevent the right-eye-side dial portion 5*b* from rotating. As a result, the rotation around the axis of the right-eye-side shaft member 5A is restricted. Therefore, when the wearer performs the operation (adjusting operation) to turn the left-eye-side dial portion 5b as a second operation portion, even if the left-eye-side shaft member 5B rotates by the rotational force (operation force), although the magnet portions 5c and 5c connected by the magnetic force only slide against each other, the rotational force (operating force) is not transmitted to the right-eye-side shaft member 5A, and the right-eye-side shaft member 5A does not rotate around the axis (second partial-transmission state). Therefore, the wearer performs the pinching operation (switching operation) to prevent the right-eye-side dial portion 5b from rotating, and then performs the operation (adjusting operation) to turn the left-eye-side dial portion 5b, so that the left-right position of only the left-eye-side variable focus lens 3 can be adjusted.

In the embodiment 2, the left-eye-side dial portion 5b that receives the adjusting operation when adjusting the left-right position of only the left-eye-side variable focus lens 3 functions as the switching operation portion when adjusting the left-right position of only the right-eye-side variable focus lens 3. In addition, the right-eye-side dial portion 5b that receives the adjusting operation when adjusting the left-right position of only the right-eye-side variable focus lens 3 functions as the switching operation portion when adjusting the left-right position of only the left-eye-side variable focus lens 3. Therefore, according to the embodiment 2, there is no need to provide a switching operation portion separately from the dial portions 5b, 5b, which are adjusting operation portions that receive adjusting operations, so that the configuration is simplified. Of course, a switching operation portion may be provided separately from the dial portions 5b, 5b which are adjusting operation portions.

Note that, the embodiment 2 includes not only the configuration in which the left-right positions of the left and right variable focus lenses 3, 3 are adjusted at once (all-transmission state), but also the configuration in which the respective left and right positions of the left and right variable focus lenses 3, 3 are individually adjusted (first partial-transmission state and second partial-transmission state), but it is not limited to this. For example, a configuration may be adopted in which the left-right position of only one of the left and right variable focus lenses 3, 3 can be adjusted.

Furthermore, although the embodiment 2 has been described using as an example a configuration in which the two shaft members 5A and 5B are connected by the magnetic force of the magnet portions 5c and 5c, it is not limited to this. For example, an electromagnet that can control to turn the magnetic field on and off by an electric signal may be used as the connecting portion that connects the two shaft members 5A and 5B.

In this case, if a turn-on operation (switching operation) that generates the magnetic field in the electromagnet is performed on the operation portion (switch, etc.) for turning the electromagnet on and off, the two shaft members 5A and 5B are connected by magnetic force. Therefore, by performing the operation (adjusting operation) by turning one of the left and right dial portions 5b, the wearer can move and adjust the left-right positions of both the left and right variable focus lenses 3, 3 at once.

On the other hand, if a turn-off operation (switching operation) is performed in which the electromagnet does not generate the magnetic field, the rotational force (operating force) is not transmitted between the two shaft members 5A and 5B (disconnecting state). Therefore, the wearer can adjust the left-right position of only the right-eye-side variable focus lens 3 by performing the operation (adjusting operation) of turning the right-eye-side dial portion 5b, and the left-right position of only the left-eye-side variable focus lens 3 by performing the operation (adjusting operation) of turning the left-eye-side dial portion 5b.

Furthermore, for example, a gear connecting portion may be used as the connecting portion that connects the two shaft members 5A and 5B. As a specific example, gear portions that contact and engage with each other from the axial direction of the shaft members 5A, 5B are provided on each end surface on the inner side in the left-right direction of the two shaft members 5A and 5B, and the shaft members 5A and 5B are supported to be displaceable in each axial direction, further a biasing force is applied to the shaft members 5A and 5B in a direction in which they approach each other from the axial direction.

In this case, when the wearer performs an operation (adjusting operation) to turn one of the left and right dial portions 5b, the two shaft members 5A and 5B are connected by engaging the gear portions of the two shaft members 5A and 5B with each other due to the biasing force, so that the left-right positions of both the left and right variable focus lenses 3, 3 can be moved and adjusted at once.

On the other hand, if the wearer performs an operation (switching operation) of pulling the left-eye-side dial portion 5b toward outer side in the axial direction (to the left side) against the biasing force, the gear portions between the two shaft members 5A and 5B are separated and the rotational force (operating force) is not transmitted (disconnecting state). Therefore, the wearer can adjust the left-right position of only the right-eye-side variable focus lens 3 by performing the operation (adjusting operation) of turning the right-eye-side dial portion 5b. Similarly, the wearer can adjust the left-right position of only the left-eye-side variable focus lens 3 by performing the operation (switching operation) of pulling the right-eye-side dial portion 5b toward outer side in the axial direction (to the right side) against the biasing force and then performing the operation (adjusting operation) of turning the left-eye-side dial portion 5b.

Figure 13:
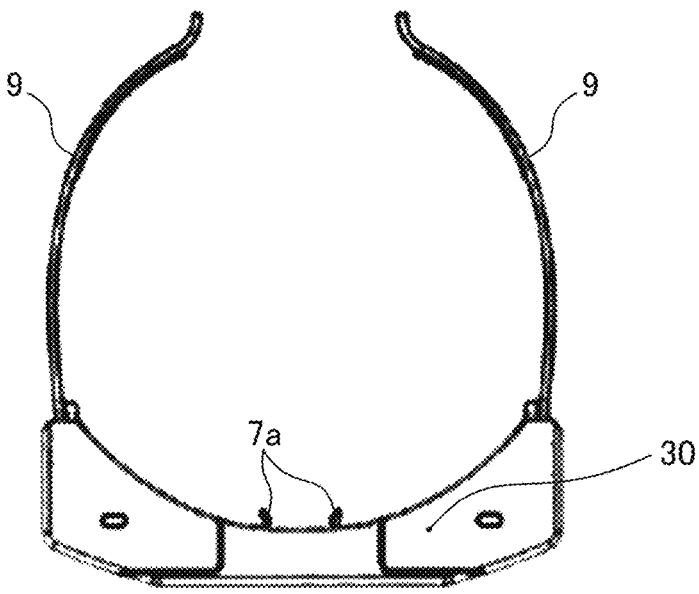
FIG. 13 is an explanatory diagram showing an example of an appearance of spectacles of the embodiment 1 and the embodiment 2.
Figure 13:
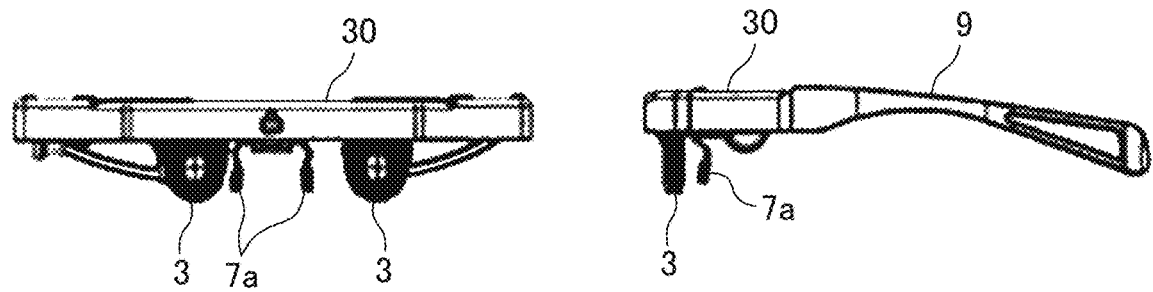

FIG. 13 is an explanatory diagram showing an example of an appearance of the spectacles 1 of the embodiment 1 and the embodiment 2 described above.

Note that what is shown at the upper part of FIG. 13 is a plan view, what is shown below the plan view is a front view, and what is shown on the right side of the front view is a side view.

In the external appearance example of FIG. 13, a part of the structure of the spectacles 1 of the embodiment 1 and embodiment 2 described above (the part excluding the variable focus lenses 3, 3, temple portions 9, 9, etc.) is inside the case cover 30.

Furthermore, in the embodiment 1 and embodiment 2 described above, the configuration that adjusts the positions of the pair of left and right variable focus lenses 3, 3 is a configuration in which the positions are adjusted by the wearer's operating force of turning the dial portions 5b, but it is not limited to this. For example, it may be a configuration in which the positions are adjusted by a driving force of a driving source such as a motor. In this case, it is preferable to be a configuration in which a measuring means (such as a distance sensor) for measuring a distance to the view object is provided in the spectacles 1, and the driving source is controlled according to a measurement result of the measuring means, thereby the positions is adjusted automatically without any operation by the wearer. In particular, according to the present invention, since it is possible to adjust the positions of the left and right pair of variable focus lenses 3, 3 with one drive source, it is possible to reduce the number of drive sources and reduce weight compared to a configuration in which the positions of each variable focus lens 3, 3 are adjusted by an individual drive source.

Although the embodiments have been described above, embodiments of the present invention are not limited to the above. For example, members constituting the spectacle frame 2 may be made of well-known materials, the bridge portion 4 may be made of a metal material, or the lens-holding portions 6 may be made of a synthetic resin material.

Other specific configurations are not limited to the embodiments described above, and various changes can be made without departing from the aim of the present invention.

REFERENCE SIGNS LIST

1: spectacles
2: spectacles frame
3: variable focus lens
4: bridge portion
4*a*: slide groove
4*b*: fixing hole, fixing groove
4*c*: bridge support portion
4*e*, 4*f*: position holding portion
5: shaft portion
5A, 5B: shaft member
5*a*: threaded portion, ridge
5*b*: dial portion
5*c*: magnet portion
6: lens-holding portion
6*a*: lens-holding member
6*b*: sliding portion
6*c*: position adjustment portion, screw moving portion
6*d*: inner wall of sliding portion
6*e*: rib
7: nose-pad portion
7*d*: fixing portion, fixing screw portion
8: endpiece portion
9: temple portion
10: control apparatus
11: main control portion
12: voltage change portion
13: operation portion
14: storage portion
20: battery
30: case cover
301: first electrode
301*a*, 301*b*: insulating layer
302A to 302H: second electrode
303, 304: window member
311: insulating liquid
312: conductive liquid
I: interface
Ia: end

The invention claimed is:

1. A position adjustment mechanism that adjusts positions of a pair of left and right variable focus lenses as ophthalmic lenses included in spectacles comprising:

an adjusting operation portion that receives an adjusting operation to adjust the positions of the pair of left and right variable focus lenses;

two moving portions that move each position of the pair of left and right variable focus lenses in respective predetermined directions by an operating force of the adjusting operation received by the adjusting operation portion; and a switching operation portion that receives a switching operation, wherein each of the two moving portions comprising:

a shaft member that is rotatably supported around an axis by a bridge portion of the spectacles and is formed with a ridge in opposite direction to the other moving portion; and a lens-holding portion that holds one of the pair of left and right variable focus lenses and screws into the ridge of the shaft member, and an all-transmission state in which the operating force is transmitted to all of the two moving portions and a partial-transmission state in which the operating force is transmitted only to one of the two moving portions are switched in response to the switching operation received by the switching operation portion, the position adjustment mechanism is configured so that the operating force of the adjusting operation received by the adjusting operation portion is transmitted only to the one of the two moving portions, and the operating force transmitted to the one of the two moving portions can be transmitted to another moving portion of the two moving portions, when the switching operation portion receives the switching operation to make a restriction of moving by the another moving portion, the partial-transmission state is switched to, and when the switching operation portion receives the switching operation to release the restriction of moving by the another moving portion, the all-transmission state is switched to, the adjusting operation portion includes a first operation portion connected only to the one of the two moving portions, and a second operation portion connected only to the another moving portion, when the second operation portion, as the switching operation portion, receives the switching operation to make the restriction of moving by the another moving portion, a first partial-transmission state in which the operating force of the first operation portion is transmitted only to the one of the two moving portions is switched to, when the first operation portion, as the switching operation portion, receives the switching operation to make the restriction of moving by the one of the two moving portions, a second partial-transmission state in which the operating force of the second operation portion is transmitted only to the another moving portion is switched to, and when either one of the first operation portion and the second operation portion, as the switching operation portion, receives the switching operation to release the restriction of moving by the moving portion corresponding to the above one operation portion, the all-transmission state in which the operating force of the another operation portion is transmitted to all of the two moving portions is switched to.

2. The position adjustment mechanism that adjusts positions of a pair of left and right variable focus lenses as ophthalmic lenses included in spectacles comprising:

an adjusting operation portion that receives an adjusting operation to adjust the positions of the pair of left and right variable focus lenses;

two moving portions that move each position of the pair of left and right variable focus lenses in respective predetermined directions by an operating force of the adjusting operation received by the adjusting operation portion; and a switching operation portion that receives a switching operation, wherein each of the two moving portions comprising:

a shaft member that is rotatably supported around an axis by a bridge portion of the spectacles and is formed with a ridge in opposite direction to the other moving portion; and a lens-holding portion that holds one of the pair of left and right variable focus lenses and screws into the ridge of the shaft member, and an all-transmission state in which the operating force is transmitted to all of the two moving portions and a partial-transmission state in which the operating force is transmitted only to one of the two moving portions are switched in response to the switching operation received by the switching operation portion, the position adjustment mechanism is configured so that the operating force of the adjusting operation received by the adjusting operation portion is transmitted only to the one of the two moving portions, and the operating force transmitted to the one of the two moving portions can be transmitted to another moving portion of the two moving portions, when the switching operation portion receives the switching operation to make a restriction of moving by the another moving portion, the partial-transmission state is switched to, and when the switching operation portion receives the switching operation to release the restriction of moving by the another moving portion, the all-transmission state is switched to, and the one of the two moving portions and the another moving portion are connected by magnetic force.

3. The position adjustment mechanism that adjusts positions of a pair of left and right variable focus lenses as ophthalmic lenses included in spectacles comprising:

an adjusting operation portion that receives an adjusting operation to adjust the positions of the pair of left and right variable focus lenses;

two moving portions that move each position of the pair of left and right variable focus lenses in respective predetermined directions by an operating force of the adjusting operation received by the adjusting operation portion; and a switching operation portion that receives a switching operation, wherein each of the two moving portions comprising:

a shaft member that is rotatably supported around an axis by a bridge portion of the spectacles and is formed with a ridge in opposite direction to the other moving portion; and a lens-holding portion that holds one of the pair of left and right variable focus lenses and screws into the ridge of the shaft member, and an all-transmission state in which the operating force is transmitted to all of the two moving portions and a partial-transmission state in which the operating force is transmitted only to one of the two moving portions are switched in response to the switching operation received by the switching operation portion, the position adjustment mechanism is configured so that the operating force of the adjusting operation received by the adjusting operation portion is transmitted only to the one of the two moving portions, and the operating force transmitted to the one of the two moving portions can be transmitted to another moving portion of the two moving portions, when the switching operation portion receives the switching operation to make a restriction of moving by the another moving portion, the partial-transmission state is switched to, and when the switching operation portion receives the switching operation to release the restriction of moving by the another moving portion, the all-transmission state is switched to, the one of the two moving portions and the another moving portion are connected by a connecting portion, and in the connecting portion, a connecting state in which the one of the two moving portions and the another moving portion are connected and a disconnecting state in which the connecting is released are switched in response to the switching operation received by the switching operation portion.

* * * * *